US011755932B2

(12) United States Patent
Butvinik

(10) Patent No.: US 11,755,932 B2
(45) Date of Patent: Sep. 12, 2023

(54) ONLINE UNSUPERVISED ANOMALY DETECTION

(71) Applicant: Actimize LTD., Ra'anana (IL)

(72) Inventor: Danny Butvinik, Haifa (IL)

(73) Assignee: Actimize LTD., Ra'anana (IL)

( * ) Notice: Subject to any disclaimer, the term of this patent is extended or adjusted under 35 U.S.C. 154(b) by 812 days.

(21) Appl. No.: 16/856,071

(22) Filed: Apr. 23, 2020

(65) Prior Publication Data

US 2021/0334673 A1 Oct. 28, 2021

(51) Int. Cl.
*G06Q 30/00* (2023.01)
*G06N 5/04* (2023.01)

(52) U.S. Cl.
CPC ..................... *G06N 5/04* (2013.01)

(58) Field of Classification Search
None
See application file for complete search history.

(56) References Cited

U.S. PATENT DOCUMENTS

| | | | | |
|---|---|---|---|---|
| 2019/0081876 A1* | 3/2019 | Ghare | ................ | H04L 63/1425 |
| 2019/0171283 A1* | 6/2019 | Dey | .................... | G06F 3/04895 |
| 2019/0364063 A1* | 11/2019 | Lee | .................... | H04L 63/1408 |
| 2020/0081445 A1* | 3/2020 | Stetson | ................... | G06N 5/02 |
| 2021/0264306 A1* | 8/2021 | Baran Pouyan | ......... | G06N 7/01 |

* cited by examiner

*Primary Examiner* — Matthew T Sittner
(74) *Attorney, Agent, or Firm* — SOROKER AGMON NORDMAN RIBA; Sharone Godesh; Daniel Schatz

(57) ABSTRACT

A computerized-method for real-time detection of anomalous data, by processing high-speed streaming data. In a computerized-system receiving a data-stream comprised of unlabeled data points, and operating an Anomalous Data Detection (ADD) module. The ADD module receives at least one of: (i) k number of data point neighbors for each data point; (ii) X number of data points in a predetermined period of time; (iii) d number of dimensions of each data point, threshold; and (iv) n number of data points that said ADD module is operating on, in a predefined time unit. Then, the ADD module prepares a dataset having n data points from the received X data points; and then identifies one or more data points, from the received data stream, as outliers to send an alert with details related to the identified outliers, thus, dynamically evaluating local outliers in the received data stream.

15 Claims, 20 Drawing Sheets

ONLINE UNSUPERVISED ANOMALY DETECTION

TECHNICAL FIELD

The present disclosure relates to the field of online incremental machine learning paradigm in which unlabeled data becomes available in a sequential order and is used to identify anomalous data in the sequenced unlabeled data, as opposed to classical machine learning approaches that are using batch learning techniques to identify anomalous data.

BACKGROUND

In current digital age, a huge amount of data is created and in the foreseeable future the amount of new information will continue to grow at an explosive trend, which requires increasing levels of computing storage and computing processing. A considerable portion of data is continuously generated from different software applications and may be forwarded as data streams for further analysis. For example, in structural health monitoring, fault detection in industrial processes and invasion and fraud detection for data communication and networks.

Accordingly, there is a need for a technical solution that will enable data mining of data streams from different software applications, to process valuable information such as anomalous data which its implementation will minimize computing resources e.g., data storage and run-time complexity of the computational operations.

Anomaly detection is commonly based on identifying outliers in the data which is a detection or observation of data that far deviates from previously observed data and as such the anomalous data is being suspected as being generated by a different mechanism i.e., by a fraudster than the mechanism of the non-fraudulent data.

Anomaly detection has attracted a wide range of attention for its broad applications, such as fault diagnosis and intrusion detection, however, its implementation poses challenges of limited computing resources on outlier analysis of infinite and unlabeled data streams between different software applications.

Accordingly, there is a need for a technical solution that will detect in real-time anomalous data by processing high-speed streaming data and will be conscious to computing resources limitations. To accommodate computing resources limitations, the needed technical solution should mainly reduce run-time complexity and storage space.

Anomalous data, such as financial fraud, is an issue with far reaching consequences in the finance industry, government and corporate sectors and for their consumers. Increasing dependence of financial services on new technologies such as cloud computing i.e., on-demand availability of computer system resources and mobile computing, in recent years, has compounded the problem of financial fraud.

Accordingly, financial institutions have implemented computational methods to automate processes of anomalous data detection, such as fraud, by using numerical and computational methods. Data mining-based approaches may be useful only when it has the ability to identify small amount of anomalous data in large datasets.

In the finance industry, financial fraud events take place frequently and result in huge financial losses for government and business sectors. With the rapid development of e-commerce and e-payment, the problem of online transaction fraud has become increasingly prominent. The reason that it became prominent is mainly because commonly an online financial transaction is facing a considerably larger volume of fund transfer compared to traditional areas. The detection of financial fraud has always been challenging due to limited computing resources to handle the large volume of financial transactions and the rarity and changing trends of financial fraud events.

Therefore, there is a need for a technical solution for detection of anomaly behavior in a rapid and instantaneous manner. In other words, there is a need for a technical solution for detection of fraudulent transactions which are received in high-speed streaming processes which may be implemented by online incremental fraud detection in the systems of banks and financial institutions.

SUMMARY

There is thus provided, in accordance with some embodiments of the present disclosure, a computerized-method for real-time detection of anomalous data, by processing high-speed streaming data is provided herein.

Furthermore, in accordance with some embodiments of the present disclosure, in a computerized-system comprising a processor and a memory, the processor may receive a data stream which may be comprised of unlabeled data points, the processor may operate an Anomalous Data Detection (ADD) module.

Furthermore, in accordance with some embodiments of the present disclosure, the ADD module may receive: a. k—a number of data point neighbors for each data point; b. X—a number of data points in a predetermined period of time; c. d—the number of dimensions of each data point, d. a threshold, and e. n—a number of data points that the ADD module is operating on, in a predefined time unit. The predetermined period of time may be three months, six months etc. The threshold may be a preconfigured threshold such as an integer number which may be used to meet a condition such as when the value of an associated outlier counter is greater than the threshold.

Furthermore, in accordance with some embodiments of the present disclosure, the ADD module may prepare a dataset having n data points from the received X data points.

Furthermore, in accordance with some embodiments of the present disclosure, the ADD module may identify one or more data points, from the received data stream, as outliers and may send an alert with details related to the identified outliers. Thus, dynamically evaluating local outliers in the received data stream.

According to some embodiments of the present disclosure, the preparation of the dataset may include: (i) fetching X data points from a data storage device, according to at least one preconfigured criterion; (ii) retrieving random n data points from the retrieved X data points to yield a dataset; (iii) for each data point in the dataset: a. applying at least one classification algorithm to yield a set of results from each applied classification algorithm and to determine k data points neighbors; b. marking the data points in the set of results as related to the dataset; c. calculating a local density; d. associating an outlier counter and zeroing said outlier counter; and e. marking said data point as a potential-outlier by increasing by 1 each associated outlier counter that its calculated local density is higher than 1. The preconfigured criterion may be financial transactions of a client's segment, for example, clients segment of accounts having more than USD 500,000 in their saving account or more than USD 500,000 in their checking account, or a combination thereof.

Furthermore, in accordance with some embodiments of the present disclosure, the local density is corresponding to a calculated heterogenous nearest neighbors Local Outlier Factor (hLOF) area of the data point.

Furthermore, in accordance with some embodiments of the present disclosure, the dataset may be a sparse dataset.

Furthermore, in accordance with some embodiments of the present disclosure, the identification of one or more data points as outliers may be performed by: a. reading a first data point and a second data point from the received data stream.

Furthermore, in accordance with some embodiments of the present disclosure, the identification of the one or more data points as outliers may be performed by: a. reading a first data point and a second data point from the received data stream; b. applying the at least one classification algorithm on the first data point and on each data point that is related to the prepared dataset, to yield a first group of results and to delete a data point that is not in the first group of results, from the dataset; c. checking the associated outlier counter of the deleted data point to mark the deleted data point as an outlier, when the value of the associated outlier counter is greater than the received threshold; d. applying the at least one classification algorithm on the first data point and on each data point in the first group of results, to yield a second group of results; e. for each data point in the second group of results: (i) applying the at least one classification algorithm on the second data point and on each data point in the second group of results, to yield a third group of results for each data point and to delete at least one data point that is not in the third group of results, from the second group of results; and (ii) calculating a local density, wherein said local density is corresponding to a calculated heterogenous nearest neighbors Local Outlier Factor (hLOF) area of the first group of results; f. checking the associated outlier counter of the at least one deleted data point that is not in the third group of results to mark the at least one deleted data point as an outlier when the value of the associated outlier counter is greater than the received threshold; g. applying the at least one classification algorithm on the second data point and on each data point in the third group of results, to yield a fourth group of results; h. for each data point in the fourth group of results: (i) applying at least one classification algorithm to yield a fifth group of results from each applied classification algorithm and to determine k data points neighbors; (ii) calculating a local density; (iii) marking said data point as a potential-outlier by increasing by 1 each associated outlier counter that its calculated local density is higher than 1; and h. marking the fifth group of results as a dataset; and j. repeating step (a) through step (j).

Furthermore, in accordance with some embodiments of the present disclosure, the local density is corresponding to a calculated heterogenous nearest neighbors Local Outlier Factor (hLOF) area of the data point Furthermore, in accordance with some embodiments of the present disclosure, the first group of results, the second group of results, the third group of results, the fourth group of results and the fifth group of results include determined k data points neighbors.

Furthermore, in accordance with some embodiments of the present disclosure, the alert that may be sent may be presented to a user via a display unit.

Furthermore, in accordance with some embodiments of the present disclosure, the alert that may be sent may be forwarded to a preconfigured application.

Furthermore, in accordance with some embodiments of the present disclosure, the data stream may be a financial data stream and the detected anomalous activity may be fraud.

Furthermore, in accordance with some embodiments of the present disclosure, the data stream may be selected from a group of: environmental sensors, social network analysis, computer network traffic, web searches or other.

Furthermore, in accordance with some embodiments of the present disclosure, the at least one classification algorithm may be: a. k Nearest Neighbors (kNN) algorithm; b. Inverse of k Nearest Neighbors (IkNN) algorithm; c. Joint of k Nearest Neighbors (JkNN) algorithm or any combination thereof.

Furthermore, in accordance with some embodiments of the present disclosure, the local density may be calculated by applying a distance-based method that may be calculating an average distance between the read data point and k nearest data point neighbors.

Furthermore, in accordance with some embodiments of the present disclosure, the k nearest data point neighbors may be calculated according to distance metrics, such as Euclidean distance metric, Manhattan distance metric or any other distance metric.

Furthermore, in accordance with some embodiments of the present disclosure, the calculated heterogenous nearest neighbors Local Outlier Factor (hLOF) area may be a set of data points which may be a combination of the set of results of each operated classification algorithm.

Furthermore, in accordance with some embodiments of the present disclosure, the received threshold may be determined according to the number of standard deviations of a data point from the mean.

Furthermore, in accordance with some embodiments of the present disclosure, the number of dimensions of a data point may be a number of attributes therein.

Furthermore, in accordance with some embodiments of the present disclosure, the data point neighbors may be determined as such, according to preconfigured distance metrics.

Furthermore, in accordance with some embodiments of the present disclosure, the ADD module may be implementing an online unsupervised machine learning model.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

DETAILED DESCRIPTION

Figure 1:
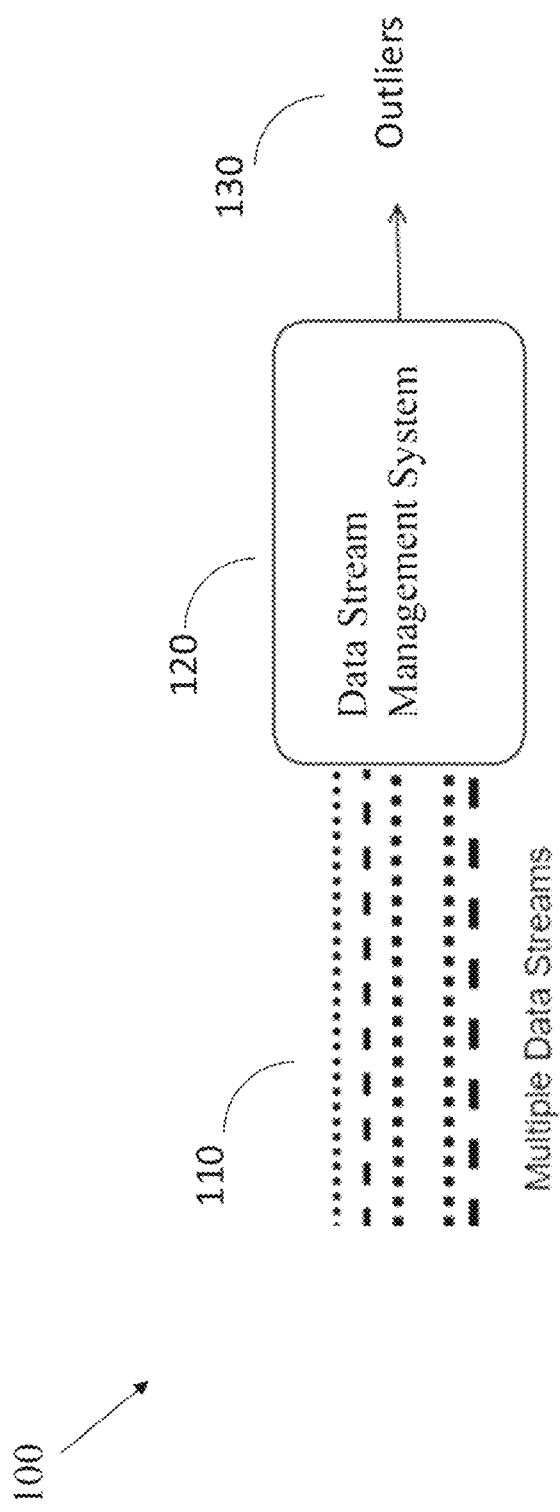
FIG. 1 schematically illustrates a high-level diagram of Data Stream Management System (DSDM), in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The term "anomaly" or "anomalous data" as used herein refers to any data that is unusual or different from the norm. It may be in financial transactions, environmental sensors, social network analysis, computer network traffic, web searches and the like.

The term "Online Incremental unsupervised Machine Learning model" as used herein refers to a dynamic technique of an unsupervised learning that may be applied when data becomes available gradually over time. Algorithms that can facilitate incremental learning are known as incremental machine learning algorithms. It can be for example, Heterogenous Nearest Neighbors Local Outlier Factor (hLOF) algorithm on which more details may be provided below.

The term "fraud" as used herein refers to money withdrawal of a fraudster out of a victim's bank account or credit card payments which are not performed by an authorized entity. Fraud may be characterized by the following characteristics: the amount that has been withdrawn, the time of the withdrawal and the place of the withdrawal or credit card payment.

The term "data stream" as used herein refers to one or more data streams which may be integrated to a received data stream. For example, payments data, customers data, communication channel data, enrichment data i.e., additional data, and the like. The data stream is a stream of data points which are streamed into an unsupervised online incremental machine learning module to identify one or more outliers. The outliers are knowledge, i.e., assumptions or interpretations as to anomalous data such as fraud or any other anomalous activity.

The term "data point" as used herein refers to a data structure such as a record which is a collection of one or more fields i.e., a set of all the attributes. It may be a record of a financial transaction such as a money withdrawal or a credit card payment. It may also be data of environmental sensors, social network analysis, computer network traffic, web searches and the like.

The term "neighbor" as used herein refers to a data point, in a dataset of data points, that is similar or the nearest or closest to another data point, according to a calculated distance metric such as Euclidian distance metric or Manhattan distance metric.

The term "k neighbors data points" as used herein refers to a number of data point neighbors for a specified data point, where k is a preconfigured integer number.

The term "examined data point" as used herein refers to a data point in a provided dataset or a data point that is read from a data stream and an operation is performed on the examined data point and other data points such as k neighbors data points to yield a result.

The term "dimensions" as used herein refers to data point dimensions which are the fields or the set of all attributes of a data point. The attributes may include alphabetic characters, numeric characters or a combination of alphabetic characters and numeric characters.

The term "noise" as used herein refers to meaningless information in attributes of data points in a dataset. It may include data corruption or any data that a user or a system cannot understand and interpret correctly.

The term "dataset" as used herein refers to a collection of data that is comprised of data points.

The term "sliding window" as used herein refers to a "window" that is formed over some part of a dataset, and this window can slide over the dataset to capture different portions of it.

The term "similar" or "similarity" as used herein refers to the distance, proximity, or closeness of objects or data points to each other. For example, a distance between two objects or data points each having two attributes may be calculated by using a two-dimensional graph with x and y axes. Each attribute may be represented as a point on the graph having a pair of numbers. Each number may represent each attribute.

The term "k Near Neighbors (kNN) algorithm" as used herein refers to an algorithm that hinges on the assumption that similar objects or data points exist in close proximity. Accordingly, kNN algorithm is operating on an examined data point that is part of a provided dataset of data points, according to a given a positive integer, k nearest neighbors. The value of k is a preconfigured number and depends on the quality of the data that is provided to the algorithm. Larger values of k reduce the effect of the noise on the quality of the algorithm results.

The term "Inverse of k Near Neighbors (IkNN) algorithm" as used herein refers to a reverse nearest neighbor algorithm which is an algorithm that is operated on an examined data point to search for a common neighbor to the examined data point and another determent data point in a provided dataset.

The term "Joint of k Near Neighbors (JkNN) algorithm" as used herein refers to neighbors of a data point and another determent data point.

The term "Heterogenous Near Neighbors (hNN) algorithm" as used herein refers to an algorithm which yields a set i.e., group of results of heterogenous near neighbors i.e., a combination of the set results of kNN, IkNN and JkNN algorithms after being operated on a data point.

The term "sparse dataset" as used herein refers to a dataset that is comprised of data points in which most attributes' value in each data point equals zero. For example, a data point in a sparse dataset which represents a financial transaction may consist of attributes with the following values: [1,23,0,0,0,4,'abc',0,0,0, 0,0,0,0,0,0,0,0,0,0,0].

The term "batch" as used herein refers to a process which performs data operation on a batch of data points offline.

The term "run-time complexity" as used herein refers to the number of operations which are performed by a module or a model, supposing that each operation takes a fixed amount of time to perform.

The term "unlabeled data" as used herein refers to data that is not classified i.e., not labeled.

The term "affected data" as used herein refers to the data points that unsupervised online incremental machine learning module is operating on.

Commonly, anomalous data includes errors and events, such as over-range records in monitoring systems and abnormal behavior in credit card fraud detection. The errors and the events are both rare and not easy to detect and a received data stream may have dynamic changes and infinite data volumes. Also, the data stream may have multiple data dimensions and large amounts of data traffic, which makes the detection of an outlier i.e., anomalous data in data streams challenging, especially for applications with limited computing capabilities, storage space and energy resources.

Accordingly, there is a need for a technical solution for processing high-speed streaming data of unlabeled data points, which becomes available in a sequential order to detect anomalous data, for example by implementing an online unsupervised incremental machine learning model, as opposed to classical machine learning approaches that are using batch learning techniques.

As a typical case, lower cost and easy to deploy wireless sensor networks are widely involved in monitoring tasks of equipment, or objects in an environment. However, these wireless sensor networks have limited calculations capabilities and limited storage capacity which may not have the capacity to handle the large volume of the monitored data of the tasks or the objects which may include anomalous data i.e., outliers. As a result, wrong decision making and responses may be performed by the subsequent control systems that receive the monitored data.

Current methods, still have room for improvement in order to reduce detection errors and omissions. For example, more reasonable local neighborhood description and corresponding efficient update strategies. Accordingly, there is a need for a technical solution that will improve efficiency and accuracy issues of outlier detection in data streams and also address issues of limited computer resources such as memory and run-time when processing unlabeled input data, e.g., reducing run-time complexity, when the data becomes available gradually over time.

In other words, there is a need for an online setting where data such as financial transactions arrives one at a time and needs to be classified as a fraud or a clean transaction without the benefit of having observed the entire sequence i.e., there is no training dataset. The data to be classified may be either a new transaction or an existing transaction.

There is thus provided, in accordance with some embodiments of the present disclosure, an online fraud detection algorithm that processes rapid pace queries of high-dimensional objects i.e., objects having multiple attributes, in a sequential order i.e., in a streaming manner. The present disclosure provides a real-time anomaly detection approach, where when implemented in systems such as systems of financial institutions, can bring suspicious activity to a full stop immediately and that ancillary harm caused by any fraud may be immediately mitigated.

According to some embodiments of the present disclosure, real-time fraud detection also aligns with regulators' efforts to restrain de-risking, where a financial institution pulls out a transaction or customer type entirely to eliminate fraud risk.

Furthermore, the present disclosure provides an online unsupervised anomalous data detection algorithm—Streaming Local Outlier Factor based Heterogenous Nearest Neighbors (hLOF) algorithm which focuses on principle research of the Local Outlier Factor (LOF), which is vital to online detection of anomalous data such as fraud in data streams.

According to some embodiments of the present disclosure, hLOF algorithm is a streaming incremental local outlier detection approach to dynamically evaluate a local outlier in a received data stream. The dynamic evaluation of local outlier may be implemented by an extended local neighborhood consisting of k nearest neighbors (lNN), Inverse k Nearest Neighbors (IkNN) and Joint nearest neighbors (JkNN) which may be estimated for each data point in a received data stream in an Anomalous Data Detection (ADD) module, such as ADD module 200 in FIG. 2.

Figure 2:
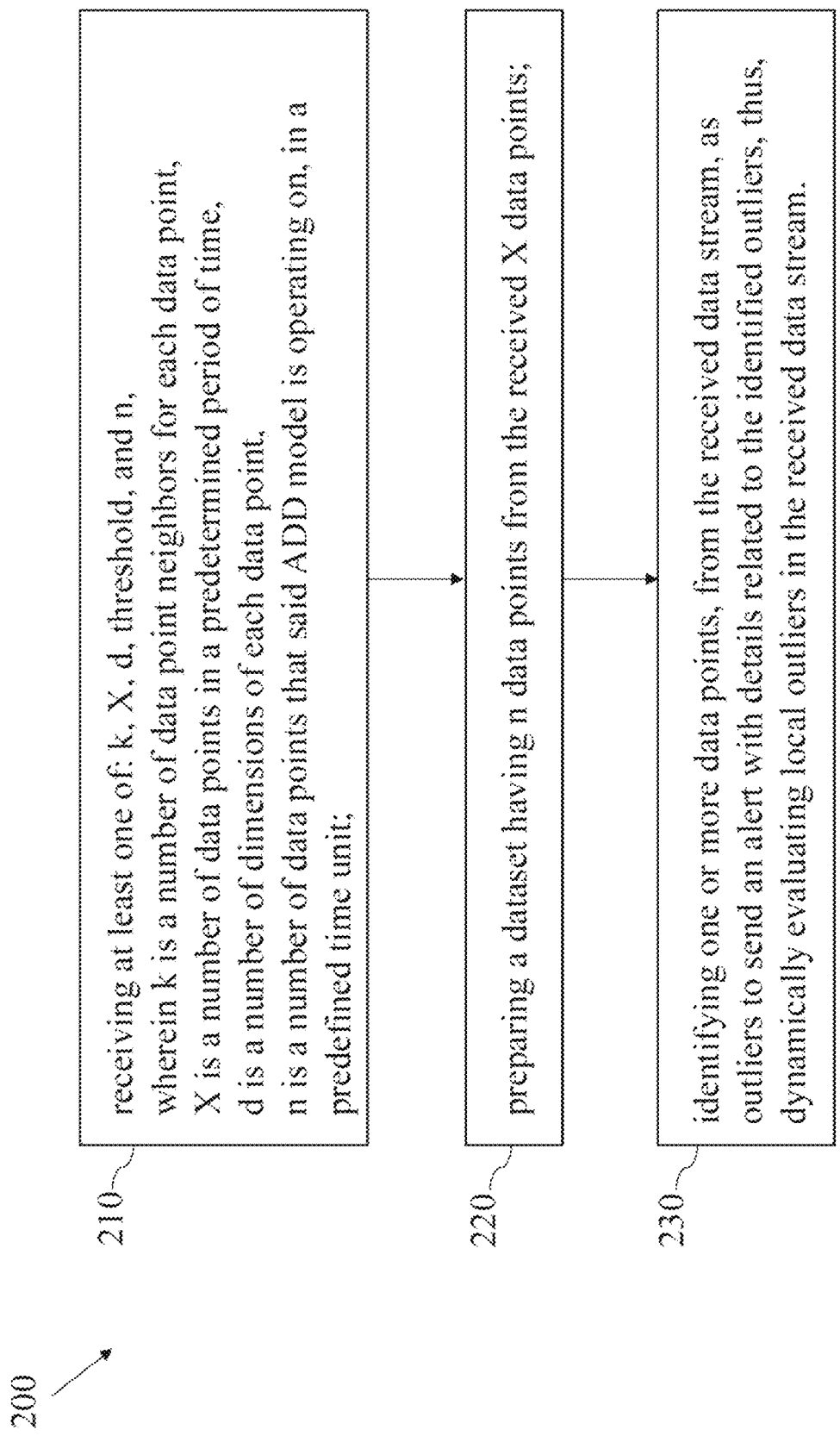
FIG. 2 is representing a flowchart depicting operations performed by an ADD module, in accordance with some embodiments of the present disclosure.

According to some embodiments of the present disclosure, the run-time complexity of the operations of an ADD module, such as ADD module 200 in FIG. 2 for an insertion of new data point and deletion of a data point in a composite neighborhood of data points, is finite for the amount of affected data in the incremental calculation.

According to some embodiments of the present disclosure, an ADD module, such as ADD module 200 in FIG. 2 may implement an incremental local outlier detection method for received data streams, in which an incremental update strategy of the composite nearest neighborhood, may include k-nearest neighbor (KNN) algorithm, reverse k-nearest neighbor, i.e., IkNN algorithm, and shared k-nearest neighbors (JkNN) algorithm.

According to some embodiments of the present disclosure, a time unit t may be preconfigured to be any value: 1 second, 5 seconds or 1 millisecond and the like.

According to some embodiments of the present disclosure, a streaming environment is a data stream processing which analyzes and performs actions on real-time data through the use of continuous queries. The process of streaming analytics includes connecting to external data sources and enabling an integration of certain data i.e., the queried data into one flow of data points.

Alternatively, the process of streaming analytics enables updating of an external database with processed information, which later on will be processed by the ADD module in FIG. 2.

FIG. 1 schematically illustrates a high-level diagram of Data Stream Management System (DSDM) 120, in accordance with some embodiments of the present disclosure.

According to some embodiments of the present disclosure, real-time financial data streams such as multiple data streams 110 may be received in a DSDM such as DSDM 120, when operating an Anomalous Data Detection (ADD) module such as ADD 200 in FIG. 2. The received multiple data streams are being processed by an ADD module such as ADD module 200 in FIG. 2 in real-time or near real time to identify one or more data points, from the received data stream, as outliers 130 and to send an alert with details related to the identified outliers 130. Thus, dynamically evaluating local outliers in the received multiple data streams 110. The outliers may be fraud activity, data of environmental sensors, results of: social network analysis, computer network traffic, web searches or the like.

According to some embodiments of the present disclosure, a data stream such as data stream in the multiple data stream 110 may be an ordered sequence of data points e.g., instances or financial records, which are arriving at each time unit to the ADD module 200 in FIG. 2. During the operation of the DSMS 120 the ADD module 200 may not be aware of the entire sequence of data points and the data may change or evolve over time. Furthermore, the DSMS 120 may not store the data that is received in the multiple data streams 110 due to limited computational resources. After the DSMS 120 analyses the data it may be discarded or may be summarized to be stored in a storage device.

FIG. 2 is representing a flowchart depicting operations performed by an ADD module 200, in accordance with some embodiments of the present disclosure.

According to some embodiment of the present disclosure, operation 210 may comprise receiving at least one of: k, X, d, threshold, and n. k may be a number of data point neighbors for each data point, X may be a number of data points in a predetermined period of time, d may be a number of dimensions of each data point, n may be a number of data points that said ADD module is operating on, in a predefined time unit.

According to some embodiment of the present disclosure, the predetermined period of time may be three months, six months, etc.

According to some embodiment of the present disclosure, the threshold may be a preconfigured threshold such as an integer number which may be used to meet a condition such as when the value of an associated outlier counter is greater than the threshold.

According to some embodiment of the present disclosure, operation 220 may comprise preparing a dataset having n data points from the received X data points.

According to some embodiments of the present disclosure, the preparing of the dataset having n data points from the received X data points may comprise: (i) fetching X data points from a data storage device, according to at least one preconfigured criterion; (ii) retrieving random n data points from the retrieved X data points to yield a dataset; (iii) for each data point in the dataset: a. applying at least one classification algorithm to yield a set of results from each applied classification algorithm and to determine k data points neighbors; b. marking the data points in the set of results as related to the dataset; c. calculating a local density, wherein said local density is corresponding to a calculated heterogenous nearest neighbors Local Outlier Factor (hLOF) area of the data point; d. associating an outlier counter and zeroing said outlier counter; and e. marking said data point as a potential-outlier by increasing by 1 each associated outlier counter that its calculated local density is higher than 1.

According to some embodiments of the present disclosure, the preconfigured criterion may be financial transactions of a client's segment, for example, client's segment of accounts having more than USD 500,000 in their saving account or more than USD 500,000 in their checking account, or a combination thereof. Another example of criterion may be a type of withdrawal, such as Automated Teller Machine (ATM) withdrawal, credit card payment and the like.

According to some embodiments of the present disclosure, the at least one classification algorithm may be one of the following algorithms or any combination thereof: a. k Nearest Neighbors (kNN) algorithm; b. Inverse of k Nearest Neighbors (IkNN) algorithm; and c. Joint of k Nearest Neighbors (JkNN) algorithm.

According to some embodiments of the present disclosure, a mathematical proof is provided herein for the number of objects in kNN $x_i$ is k which is following directly from the definition of k-nearest neighbors (kNN).

According to some embodiments of the present disclosure, the mathematical proof of having the max number or inverse k nearest neighbors of a record $x_i$ that is: (i) proportional to k; exponentially proportional to data dimensions d; and (iii) does not depend on total number n in dataset X, is:

$$|\text{inv-NN}(x_i)| \le F(k2^D\sqrt{D})$$

whereby:
  $|\text{inv-NN}(x_i)|$ is proportional to k;
  $|\text{inv-NN}(x_i)|$ is exponentially proportional to data dimension d; and
  $|\text{inv-NN}(x_i)|$ does not depend on n.

According to some embodiments of the present disclosure, the max number of joint k-nearest neighbors (JkNN) of record $x_i$ is: (i) proportional to $k^2$; (ii) exponentially proportional to data dimension d; and (iii) does not depend on total number n in dataset X.

According to some embodiments of the present disclosure, the joint k-nearest neighbors JkNN of $x_i$ are composed of inverse k-nearest neighbors (IkNN) of $x_i$'s k-nearest neighbors, then $$|\text{JkNN}(x_i)|=|\text{kNN}(x_i)||\text{IkNN}(x_i)(x_i)| \le \theta(k^2 2^D\sqrt{D})$$

which proves that $|\text{JkNN}(x_i)|$ is proportional to $k^2$, exponentially proportional to data dimension D, and does not depend on the total number n data points in dataset X.

According to some embodiment of the present disclosure, ADD module 200 which may implement an unsupervised incremental outlier detection may operate a fixed sliding window with a user-specified width that is involved in the hLOF algorithm, where a new data point has to be continuously inserted into the sliding window, and an obsolete data point has to be continuously deleted from the sliding window simultaneously to adapt to the non-homogeneity in the received data streams. The sliding window is the amount of data points that the hLOF is operating on.

According to some embodiments of the present disclosure, operation 230 may comprise identifying one or more data points, from the received data stream, as outliers to send an alert with details related to the identified outliers, thus, dynamically evaluating local outliers in the received data stream such as the multiple data streams 110 in FIG. 1.

According to some embodiments of the present disclosure, the alert may be sent to a user and details related to the identified outliers may be presented via a display unit. Or alternatively, the alert may be sent to an application for further processing or analysis.

According to some embodiments of the present disclosure, the identifying of one or more data points as outliers may be performed by: a. reading a first data point and a second data point from the received data stream; b. applying the at least one classification algorithm on the first data point and on each data point that is related to the prepared dataset, to yield a first group of results and to delete a data point that is not in the first group of results, from the dataset; c. checking the associated outlier counter of the deleted data point to mark the deleted data point as an outlier when the value of the associated outlier counter is greater than the received threshold; d. applying the at least one classification algorithm on the first data point and on each data point in the first group of results to yield a second group of results; e. for each data point in the second group of results: (i) applying the at least one classification algorithm on the second data point and on each data point in the second group of results, to yield a third group of results for each data point and to delete at least one data point that is not in the third group of results, from the second group of results; (ii) calculating a local density, wherein said local density is corresponding to a calculated heterogenous nearest neighbors Local Outlier Factor (hLOF) area of the first group of results; f. checking the associated outlier counter of the at least one deleted data point that is not in the third group of results to mark the at least one deleted data point as an outlier when the value of the associated outlier counter is greater than the received threshold; g. applying the at least one classification algorithm on the second data point and on each data point in the third group of results, to yield a fourth group of results; h. for each data point in the fourth group of results: (i) applying at least one classification algorithm to yield a fifth group of results from each applied classification algorithm and to determine k data points neighbors; (ii) calculating a local density, wherein said local density is corresponding to a calculated heterogenous nearest neighbors Local Outlier Factor (hLOF) area of the data point; and (iii) marking said data point as a potential-outlier by increasing by 1 each associated outlier counter that its calculated local density is higher than 1; and i. marking the fifth group of results as a dataset; and j. repeating step (a) through step (j).

According to some embodiments of the present disclosure, the calculating a local density may be performed by using a distance-based method to estimate the local density of an object corresponding to its hLOF area. Given a set of D dimensional objects $X=\{x_1, x_2, \ldots, x_n\}$, and $|X|=n$ the number of data in a sampling data set or size of the sliding window, where $x_i \in R^D$ for $i=1, 2, \ldots, n$, the distance-based method may calculate an average distance from $x_i$ to its k nearest neighbors $kNN(x_i)$ as the local density of $x_i$:

$$p(x_i) = \frac{1}{k} \sum_{x_j \in kNN(x_i), j \neq i} \|x_i - x_j\|$$

where $\|x_i - x_j\|$ denotes the Euclidean distance between $x_i$ and $x_j$. This data-based density estimation may be used for its non-parametric property and low computational complexity.

According to some embodiments of the present disclosure, after the calculating of the local density of all objects in the dataset, the Heterogenous Nearest Neighbors based local outlier factor algorithm (hLOF) may be calculated to measure the density deviation of an object $x_i$ from its heterogenous nearest-neighbor $hNN(x_i)$, and is defined as follows:

$$hLOF(x_i) = p(x_i)/(1/hNN(x_i)\Sigma p(x_k))$$

whereby, $i \neq k$; and $x_k \in hNN(x_i)$ $|hNN(x_i)|$ denotes the number of objects in $hNN(x_i)$. The expected value of hLOF is equal to 1 when $x_i$ and its INN neighbors are sampled from the same distribution, which indicates the lower bound of hLOF for outlier detection.

According to some embodiments of the present disclosure, if $hLOF(x_i)$ is much larger than 1, then $x_i$ would be an outlier. If $hLOF(x_i)$ is equal to or smaller than 1, then $x_i$ would not be an outlier. An outlier count for each data $x_i$ in the data stream is engineered further. The outlier count of $x_i$ will be increased by 1 if $hLOF(x_i)$ is greater than 1.

According to some embodiments of the present disclosure, $x_i$ may be considered as an outlier when its outlier count is greater than or equal to the received, preconfigured threshold. For a fixed sliding window with n data points, each data point $x_i$ may be processed n times by the hLOF method. The size of the sliding window is a criterion for outlier determination which may take the advantage of the temporal correlation of the data.

For example, in a two-dimensional dataset which consists of an outlier $x_1$ and having a dense region, and a sparse region, where $k=2$, $x_1$ is an outlier in the dense region, and $x_2$ is surrounded by both dense and sparse data. When applying classical algorithms such as kNN, IkNN, JkNN, and hNN on $x_1$ and $x_2$ then if only kNN would be used to calculate the Local Outlier Factor (LOF) of $x_1$ and $x_2$ then a wrong result would be yield which would wrongly show that both $x_1$ and $x_2$ have the same outlierness. In other words, according to some embodiments of the present disclosure, more accurate result is achieved when all classification algorithms such as kNN, JkNN, and JkNN are applied on a data point for estimating the local neighborhood characteristics. As in the example of $x_2$ is surrounded by both dense and sparse data, and conversely $x_1$ is only surrounded by dense data. Thus, $x_1$ has much higher outlierness than $x_2$.

According to some embodiments of the present disclosure, in operation 230, in the insertion phase of new data $x_{new}$, the hNN i.e., a group of results and hLOF area of $x_{new}$ are first calculated based on the distance between $x_{new}$ and the rest of the data in the sliding window. Then, the affected data objects should be found, and their hNN and hLOF are updated.

According to some embodiments of the present disclosure, the hNN is a group of results when applying at least one of the classification algorithms and may be the first group of results, the second group of results, the third group of results, the fourth group of results and the fifth group of results.

According to some embodiments of the present disclosure, the at least one of the classification algorithms may be the following algorithms or any combination thereof: a. kNN algorithm; b. IkNN algorithm; and c. JkNN algorithm.

Figure 3A:
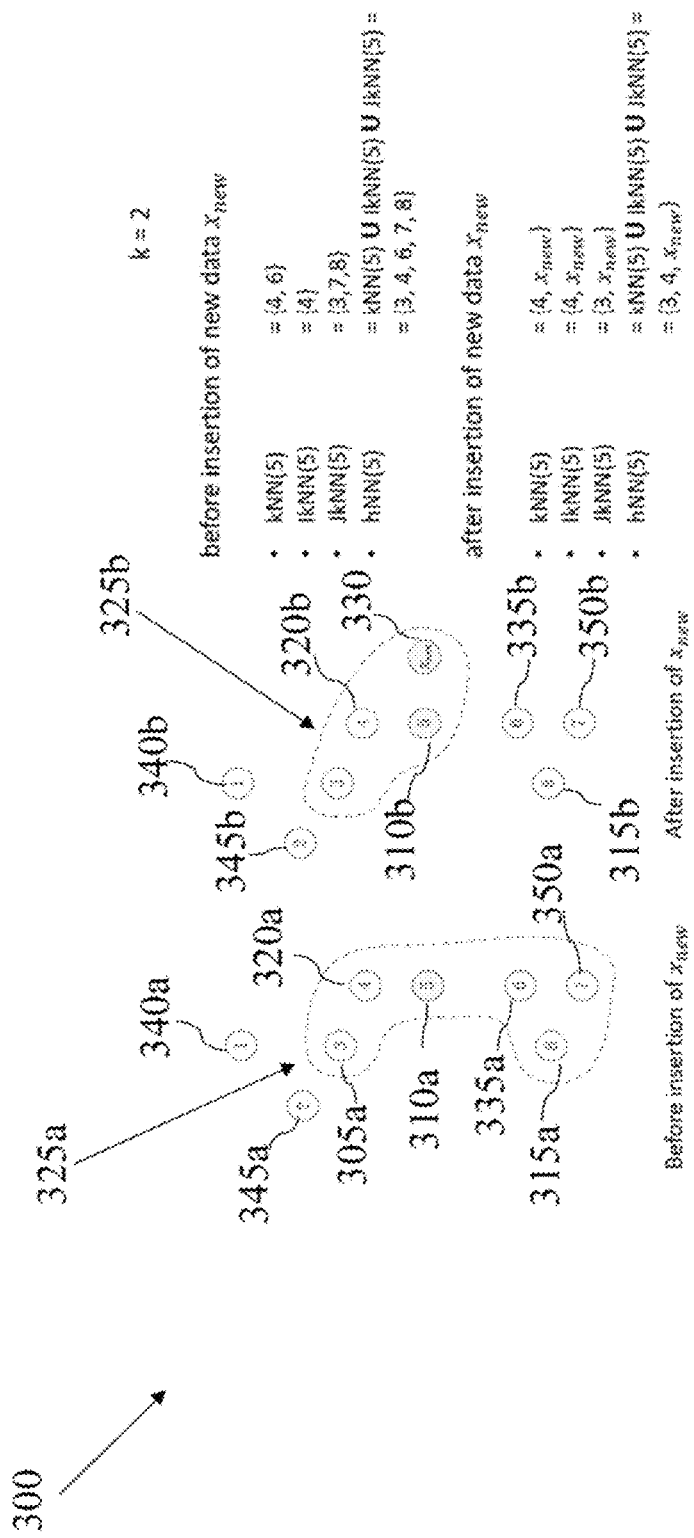
FIGS. 3A-3B are a high-level diagram depicting the influence of insertion of two consequence new data points to a local neighborhood 300, in accordance with some embodiments of the present disclosure.
Figure 3B:
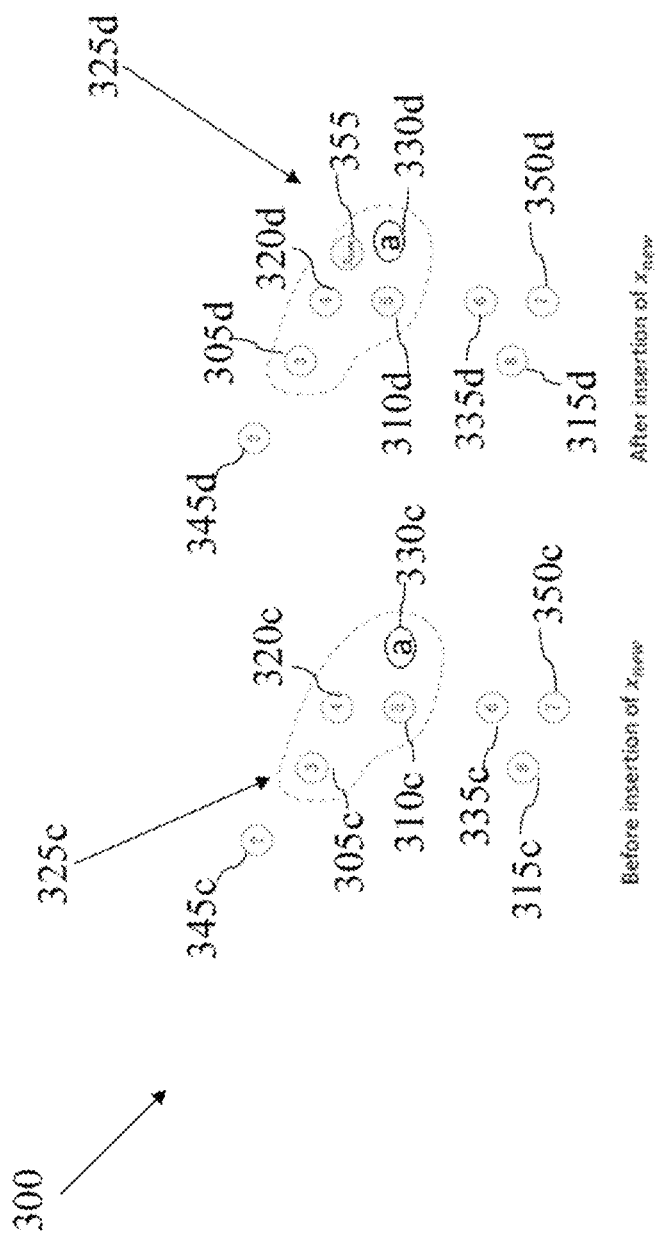

FIGS. 3A-3B are a high-level diagram depicting the influence of insertion of two consequence new data points to a local neighborhood 300, in accordance with some embodiments of the present disclosure.

According to some embodiments of the present disclosure, in a non-limiting example, in FIG. 3A, for k=2, when the calculation starts with data point '5' 310*a* the two data point neighbors are: (i) data point '4' 320*a* and (ii) data point '6' according to:

$$p(x_i) = \frac{1}{k} \sum_{x_j \in kNN(x_i), j \neq i} \|x_i - x_j\|$$

Accordingly, P(5)=½(1+2)=1.5, when the distance |$x_i-x_j$| between data point '5' 310*a* and data point '4' 320*a* is 1 and the distance between data point '5' 310*a* and data point '6' 335*a* is 2.

According to some embodiments of the present disclosure, when applying the following classification algorithms, kNN, IkNN and JkNN on data point '5' 310*a*:

kNN(5)={4, 6}
IkNN(5)={4}
JkNN(5)={3, 7, 8}
hNN(5)=kNN(5)∪IkNN(5)∪JkNN(5)={3, 4, 6, 7, 8} then, according to some embodiments of the present disclosure, hNN includes the following data points: {3, 4, 6, 7, 8] 325*a*, the following calculation may be performed for data point '5' 310*a* according to:

hLOF($x_i$)=p($x_i$)/(1/hNN($x_i$)Σp($x_k$))

such that, Σp($x_k$)=p(3)+p(4)+p(6)+p(7)+p(8), whereby $$p(x_i) = \frac{1}{k} \sum_{x_j \in kNN(x_i), j \neq i} \|x_i - x_j\|$$

therefore, when k=2 1/k is ½ and for $x_i$=3:
p(3)=½ (1+2)=1.5, when the accumulated distance of |$x_i-x_j$| between data point $x_i$ such as '3' 305*a* and a data point $x_j$∈{2,4} is calculated so: the distance between data point $x_i$='3' 305*a* and data point $x_j$='2' 345*a* equals 1 and the distance between data point $x_j$='3' 305*a* and data point $x_j$='4' 320*a* equals 2.
for $x_i$=4
p(4)=½(2+1)=1.5, when the accumulated distance of |$x_i-x_j$| between data point $x_i$ such as '4' 320*a* and a data point $x_j$∈{3,5} is calculated so: the distance between data point $x_i$='4' 320*a* and data point $x_j$='3' 345*a* equals 2 and the distance between data point $x_i$='4' 305*a* and data point $x_j$='5' 310*a* equals 1.
for $x_i$=6
p(6)=½ (2+3)=2.5 when the accumulated distance of |$x_i-x_j$| between data point $x_i$ such as '6' 335*a* and a data point $x_j$∈{5,7} is calculated so: the distance between data point $x_i$='6' 335*a* and data point $x_j$='5' 310*a* equals 2 and the distance between data point $x_i$='6' 305*a* and data point $x_j$='7' 350*a* equals 3.
for $x_i$=7
p(7)=½ (2+3)=2.5 when the accumulated distance of |$x_i-x_j$| between data point $x_i$ such as '7' 350*a* and a data point $x_j$∈{8,6} is calculated so: the distance between data point $x_i$='7' 350*a* and data point $x_j$='6' 335*a* equals 3 and the distance between data point $x_i$='7' 350*a* and data point $x_j$='8' 315*a* equals 2.

for $x_i$=8
p(8)=½ (2)=1 when the accumulated distance of |$x_i-x_j$| between data point $x_i$ such as '8' 315*a* and a data point $x_j$∈{7} is calculated so: the distance between data point $x_i$='8' 315*a* and data point $x_j$='7' 350*a* equals 2.
hLOF(5)=p(5)/(1/hNN(5)*(p(3)+p(4)+p(6)+p(7)+p(8)))=1.5/(0.2*9)<1
whereby, 1/hNN(5)=0.2, and ((p(3)+p(4)+p(6)+p(7)+p(8))=(1.5+1.5+2.5+2.5+1)=9.

According to some embodiments of the present disclosure, when hLOF(5)<1 data point '5' 310*a* may not be marked as an outlier or a potential-outlier.

According to some embodiments of the present disclosure, after an insertion of $x_{new}$ 330, obsolete data point '1' 340*a* may be deleted from the dataset. Therefore, after applying the following classification algorithms, kNN, IkNN and JkNN on data point '5' 310*b* hNN may result in dataset that includes the following data points: {3,4,new] 325*b*.

According to some embodiments of the present disclosure, after insertion of a new data point 330, the hNN(5) 325*a* has changed to 325*b*.

kNN(5) = {4, $x_{new}$}
IkNN(5) = {4, $x_{new}$}
JkNN(5) = {3, $x_{new}$}
hNN(5) = kNN(5) ∪ IkNN(5) ∪ JkNN(5) =
= {3, 4, $x_{new}$}

$$p(x_i) = \frac{1}{k} \sum_{x_j \in kNN(x_i), j \neq i} \|x_i - x_j\|$$

P(5)=½*(1+1)=1 when the distance |$x_i-x_j$| between data point '5' 310*b* and new data point 330 is 1 and the distance between data point '5' 310*b* and data point '4' 335*b* is 1.
p(3)=½ (1+2)=1.5, when the accumulated distance of |$x_i-x_j$| between data point $x_i$ such as '3' 305*b* and a data point $x_j$∈{2,4} is calculated so that the distance between data point $x_i$='3' 305*b* and data point $x_j$='2' 345*b* equals 1 and the distance between data point $x_i$='3' 305*b* and data point $x_j$='4' 320*b* equals 2.
p(4)=½ (2+1)=1.5, when the accumulated distance of |$x_i-x_j$| between data point $x_i$ such as '4' 320*b* and a data point $x_j$∈{3,5} is calculated so that the distance between data point $x_i$='4' 320*b* and data point $x_j$='3' 345*b* equals 2 and the distance between data point $x_i$='4' 305*b* and data point $x_j$='5' 310*b* equals 1.
p($x_{new}$)=½ (1)=2.5 when the accumulated distance of |$x_i-x_j$| between data point $x_i$ such as new data point 330 and a data point $x_j$∈{5} is calculated so that the distance between the new data point $x_{new}$ 330 and data point $x_j$='5' 310*b* equals 1.
whereby, 1/hNN(5)=0.333, p(3)+p(4)+p($x_{new}$)=(1.5+1.5+0.5)=3.5.
Accordingly, hLOF(5)=p(5)/(1/hNN(5)*(p(3)+p(4)+p($x_{new}$)))=1.5/(0.33*3.5)<1

According to some embodiments of the present disclosure, when hLOF(5)<1 data point '5' 310*b* may not be marked as an outlier or a potential-outlier. Then, obsolete data point '1' 340*a* may be deleted from the dataset i.e., group of results, thus the size of the sliding window remains fixed.

According to some embodiments of the present disclosure, FIG. 3B shows the calculation for data point '5' 310*c* which now has two data point neighbors, which are: (i) data point '4' 320c and (ii) data point 'a' 330c, which was previously entered, according to:

$$p(x_i) = \frac{1}{k} \sum_{x_j \in kNN(x_i), j \neq i} \|x_i - x_j\|$$

Accordingly, P(5)=½ (1+1)=1, when the distance $|x_i-x_j|$ between data point '5' 310c and data point '4' 320c is 1 and the distance between data point '5' 310c and data point 'a' 330c, which was previously entered, is 1.

According to some embodiments of the present disclosure, when applying the following classification algorithms, kNN, IkNN and JkNN on data point '5' 310c:

$$kNN(5) = \{4, a\}$$
$$IkNN(5) = \{3, a\}$$
$$JkNN(5) = \{3, a\}$$
$$hNN(5) = kNN(5) \cup IkNN(5) \cup JkNN(5) =$$
$$= \{3, 4, a\}$$

Then, according to some embodiments of the present disclosure, hNN includes the following data points: {3,4,a} 325c, the following calculation may be performed for data point '5' 310c according to:

hLOF($x_i$)=p($x_i$)/(1/hNN($x_i$)Σp($x_k$))

such that, Σp($x_k$)=p(3)+p(4)+p(a), whereby $$p(x_i) = \frac{1}{k} \sum_{x_j \in kNN(x_i), j \neq i} \|x_i - x_j\|$$

therefore, when k=2 1/k is 0.5 and for $x_i$=3:
  p(3)=½ (1+2)=1.5, when the accumulated distance of $|x_i-x_j|$ between data point $x_i$ such as '3' 305c and a data point $x_j \in \{2,4\}$ is calculated so that the distance between data point $x_i$='3' 305c and data point $x_j$='2' 345c equals 1 and the distance between data point $x_i$='3' 305c and data point $x_j$='4' 320c equals 2.
  p(4)=½ (2+1)=1.5, when the accumulated distance of $|x_i-x_j|$ between data point $x_i$ such as '4' 320c and a data point $x_j \in \{3,5\}$ is calculated so that the distance between data point $x_i$='4' 320c and data point $x_j$='3' 345c equals 2 and the distance between data point $x_i$='4' 305c and data point $x_j$='5' 310c equals 1.
  p(a)=½ (1)=0.5 when the accumulated distance of $|x_i-x_j|$ between data point $x_i$ such as data point 'a' 330c, which was previously entered, and a data point $x_j \in \{5\}$ is calculated so that, the distance between data point 'a' 330c, which was previously entered, and data point $x_j$='5' 310c equals 1.
hLOF(5)=p(5)/(1/hNN(5)*(p(3)+p(4)+p(a)))=1.5/(0.333*3.5)<1
  whereby, 1/hNN(5)=0.333, ((p(3)+p(4)+p(a)=3.5.

According to some embodiments of the present disclosure, when hLOF(5)<1 data point '5' 310c may not be marked as an outlier or a potential-outlier.

According to some embodiments of the present disclosure, after an insertion of $x_{new}$ 330, obsolete data point '2' 345d may be deleted from the dataset. Therefore, after applying the following classification algorithms, kNN, IkNN and JkNN on data point '5' 310d hNN may result in dataset that includes the following data points: {3,4,a} 325d.

According to some embodiments of the present disclosure, the hNN(5) 325c has changed to 325d.

$$kNN(5) = \{4, a\}$$
$$IkNN(5) = \{3, a\}$$
$$JkNN(5) = \{3, a\}$$
$$hNN(5) = kNN(5) \cup IkNN(5) \cup JkNN(5) =$$
$$= \{3, 4, a\}$$

$$p(x_i) = \frac{1}{k} \sum_{x_j \in kNN(x_i), j \neq i} \|x_i - x_j\|$$

P(5)=½*(1+1)=1 when the distance $|x_i-x_j|$ between data point '5' 310c and data point 330d is 1 and the distance between data point '5' 310d and data point '4' 335d is 1.
  p(3)=½ (1+2)=1.5, when the accumulated distance of ($x_i-x_j$| between data point $x_i$ such as '3' 305d and a data point $x_j \in \{2,4\}$ is calculated so that the distance between data point $x_i$='3' 305d and data point $x_j$='2' 345d equals 1 and the distance between data point $x_i$='3' 305d and data point $x_j$='4' 320d equals 2.
  p(4)=½ (2+1)=1.5, when the accumulated distance of $|x_i-x_j|$ between data point $x_i$ such as '4' 320d and a data point $x_j \in \{3,5\}$ is calculated so that the distance between data point $x_i$='4' 320d and data point $x_j$='3' 345d equals 2 and the distance between data point $x_i$='4' 305d and data point $x_j$='5' 310d equals 1.
  p(a)=½ (1)=0.5 when the accumulated distance of $|x_i-x_j|$ between data point $x_i$ such as data point 330d and a data point $x_j \in \{5\}$ is calculated so that the distance between the data point 330d and data point $x_j$='5' 310d equals 1.
  whereby, 1/hNN(5)=0.333, p(3)+p(4)+p(a)=3.5.
  Accordingly, hLOF(5)=p(5)/(1/hNN(5)*(p(3)+p(4)+p(a)))=1/(0.33*3.5)<1

According to some embodiments of the present disclosure, when hLOF(5)<1 data point '5' 310d may not be marked as an outlier or a potential-outlier. Then, obsolete data point '2' 345d may be deleted from the dataset i.e., group of results, thus the size of the sliding window remains fixed.

According to some embodiments of the present disclosure, the run-time complexity of ADD module 200 in FIG. 200 which is implementing an online unsupervised incremental update strategy may be reduced according to the following mathematical proofs.

According to some embodiments of the present disclosure, after insertion of new data $x_{new}$, the amount of kNN affected data is |kNN|$_{affected}$=|IkNN($X_{new}$)|.

According to some embodiment of the present disclosure, kNN affected objects are those that contain $x_{new}$ in their kNN, and |kNN|$_{affected}$ equals |IkNN($x_{new}$)|. According to:

$$|IkNN(x_{new})| \leq F = \theta(K2^D\sqrt{D})$$

where F is the max number of data points in the group of results of IkNN algorithm.

According to some embodiments of the present disclosure, after an insertion of a new data point $x_{new}$, the amount of IkNN affected data points is |IkNN|$_{affected}$=|kNN($x_{new}$)|+|IkNN($x_{new}$)|.

According to some embodiments of the present disclosure, IkNN affected data points contain data points in kNN($x_{new}$) and objects that are deleted from kNN of data points in IkNN($x_{new}$). For objects in IkNN($x_{new}$), their kNN will include $x_{new}$ and will delete one IkNN affected data point at the same time. It indicates that the amount of data points that are deleted from kNN of data points in IkNN ($x_{new}$) equals |IkNN($x_{new}$)|. Then, |IkNN|$_{affected}$ equals |kNN ($x_{new}$)|+|IkNN($x_{new}$)|≤k+F.

According to some embodiments of the present disclosure, after insertion of new data point $x_{new}$, the amount of JkNN affected data points is |JkNN|$_{affected}$=|IkNN($x_{new}$) |*|IkNN($x_{remove}$)|.

According to some embodiment of the present disclosure, data point $x_{remove}$ is deleted from kNN of some data points after the insertion of data point $x_{new}$, which results in the break of joint neighborhood relationship between data points in IkNN($x_{remove}$). When only one new data point such as $x_{new}$ is inserted, the amount of data point $x_{remove}$ obviously equals the amount of kNN affected data, which is |IkNN ($X_{new}$)|, as proved above in |IkNN($x_{new}$)|≤F=θ($K2^D\sqrt{D}$). Then, |JkNN|$_{affected}$=|IkNN($x_{new}$)|*|IkNN($x_{remove}$)|≤$F^2$=θ ($k^2 2^{2D} D$).

According to some embodiments of the present disclosure, the amount of affected data points in the incremental update strategy, for an outlier detection is limited. Therefore, the asymptotic run-time complexity for insertion of new data points i.e. the incremental strategy is:

$$T_{insertion} = O(|kNN|_{affected} * T_{kNN} + |IkNN|_{affected} * T_{IkNN} + |JkNN|_{affected} T_{JkNN}*)$$

where $T_{kNN}$, $T_{IkNN}$, and $T_{JkNN}$ are respectively the run-time consumptions of the operations in kNN, IkNN, and JkNN methods, and can be approximated by $T_{kNN}=T_{IkNN}=T_{JkNN}=O(\log n)$ when efficient indexing structures for inserting data points are used in a fixed sliding window with n data points width. Then:

$$T_{insertion} = O((k+F+F^2)*\log n)$$

According to some embodiments of the present disclosure, when all updates to the dataset of size N are applied, the run-time complexity of operations of the incremental update algorithm is O(N log N), which proves reduction of run-time complexity of operations. As the processes of insertion and deletion in the sliding window are opposite to each other, they have the same run-time complexity. Then, because of the limitation of length of the sliding window, no additional proof of the deletion process within the sliding window is discussed here.

According to some embodiments of the present disclosure, the pseudocode of ADD module 200 in FIG. 200 may be as follows:

```
Input: k, X, d, n, thr and N = |X| > (2n − 1)
thr: determined according to business logic in financial domain. For example, how many standard
     deviation specific transaction is from the mean (according to its payment amount outcome).
Output: alerts when outlier is detected
 1  acquires n data points (n ≥ 1) as the first dataset
 2  searches kNN, IkNN, and JkNN for x_i and 1 ≤ i ≤ n
 3  calc hLOF(x_i). If hLOF(x_i) > 1, outlier count of x_i increased by 1
 4  acquires new data x_{new 1}, run kNN, IkNN, and JkNN for x_i , having x_{new 1}, and delete obsolete
    data point x_{obsolete 1} accordingly
 5  if outlier count of x_{obsolete 1} ≥ thr (1 ≤ thr ≤ n), x_{obsolete 1} is outlier, alert!
 6  run kNN, IkNN, and JkNN for x_{new 1} , and 2 ≤ i ≤ n + 1
 7  updates kNN, IkNN, JkNN and hLOF for affected data
 8  calc hLOF(x_i), if hLOF(x_i) > 1, outlier count of x_i increased by 1
 9  acquires new data x_{new 2} , run kNN, IkNN, and JkNN for x_i , having x_{new 2}, and delete obsolete
    data point x_{obsolete 2} accordingly
10  if outlier count of x_{obsolete 2} ≥ thr (1 ≤ thr ≤ n), x_{obsolete 2} is outlier, alert!
11  run kNN, IkNN, and JkNN for x_{new 2} and 3 ≤ i ≤ n + 2
12  updates kNN, IkNN, JkNN and hLOF for affected data
13  calc hLOF(x_i), if hLOF(x_i) > 1, outlier count of x_i increased by 1
14  continue with steps 4-13
```

According to some embodiments of the present disclosure, if hLOF($x_i$) is continuously greater than 1 and its outlier count is greater than or equal to a threshold t (1≤t≤n), then data point $x_i$ may be identified as an outlier.

According to some embodiments of the present disclosure, the basis for the identification of the data point as an outlier is performed under the consideration that data streams are dynamically changing, and that a local outlier should be significantly different from its prior and post data point. Therefore, an embodiment of the present disclosure uses the prior data point and post n−1 data points for each data point $x_i$ to detect the outlierness of the data point, where the outlierness of data point $x_i$ (n≤i≤N−n+1) may be calculated n times. n is the size of the sliding window width and N is the total amount of data in X.

According to some embodiments of the present disclosure, experiments which have implemented the present disclosure of incremental unsupervised local outlier detection approach to dynamically evaluate the local outlier in a data stream, have been performed on synthetic datasets, to verify the scalability and accuracy of anomaly detection such as fraud detection. All results as presented in FIGS. 4A-4F and FIGS. 5A-5I, and described in detail below, show that the implementation of the present disclosure provides performance improvement compared to state-of-the-art k nearest neighbor-based methods. The performance improvement is reflected in reduced run-time complexity of the operations, scalability and parameter selection.

According to some embodiments of the present disclosure, experimental results of extensive experiments on synthetic datasets which implement the present disclosure demonstrate performance improvement compared to k-nearest neighbor-based (kNN) method.

According to some embodiments of the present disclosure, the following rules are used to define synthetic datasets with uniform (uniformly distributed in [−1, 1]) and standard Gaussian distributions (zero mean and unit covariance matrix), which were characterized as a different number of data records where N∈{100, 200, . . . , 5000}, different number of dimensions D∈{2, 4, 6, 8, 10}, and different parameters k (5, 10, 15, 20).

According to some embodiment of the present disclosure, for each dataset with specific N, D and k, a total of 50 constructions and computations were repeated to remove the effect of random factors. New data with the same distribution of the dataset were inserted to analyze the amount of hLOF affected data.

New data with the same distribution of datasets has been inserted to analyze the efficiency of updating the local outlier factors in a new sliding window.

Figure 4A:
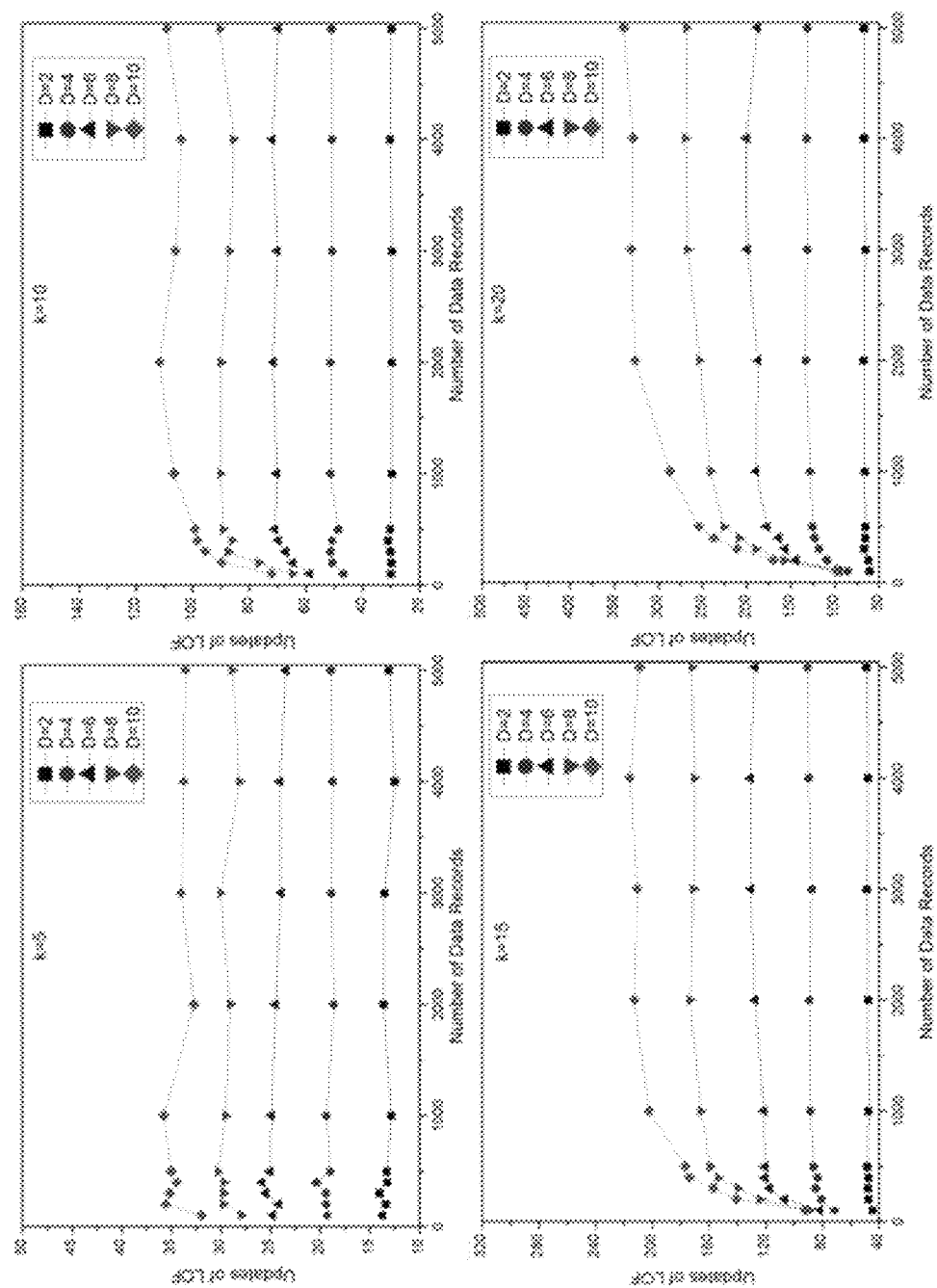
FIGS. 4A-4B illustrate experimental results of the dependence of the number of hNN-based Local Outlier Factor (hLOF) updates on the total number of data records N, data dimensions d, and parameter k in various distributions, in accordance with some embodiments of the present disclosure.
Figure 4B:
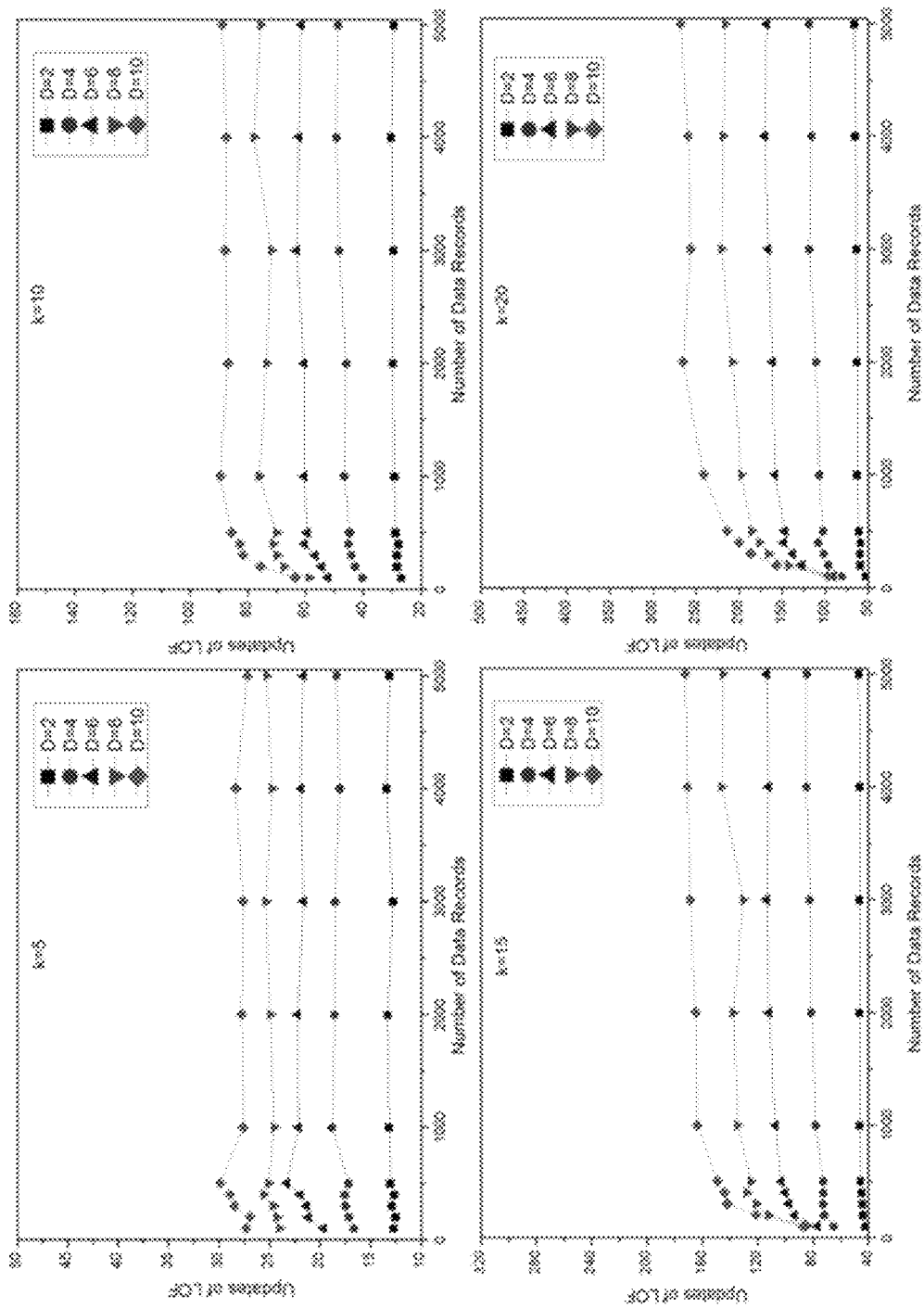

FIG. 4A-4B shows experimental results of the dependence of the number of hNN-based Local Outlier Factor (hLOF) updates on the total number of data records N, data dimensions d, and parameter k in various types of distributions, in accordance with some embodiments of the present disclosure.

FIG. 4A shows the dependence of the number of hLOF updates on the total number of data records N, data dimension D, and parameter k in standard Gaussian distribution.

FIG. 4B shows the dependence of the number of hLOF updates on the total number of data records N, data dimension D, and parameter k in uniform distribution.

According to some embodiments of the present disclosure, FIGS. 4A-4B show that the number of hLOF updates, which were obtained from the mean result of 100 synthetic dataset generations and calculations, do not depend on the data amount N, and are stable when N was sufficiently large (N>2000). Also, FIGS. 4A-4B show that as the value of k and D is getting larger, the number of hLOF updates is also getting much larger.

Figure 4C:
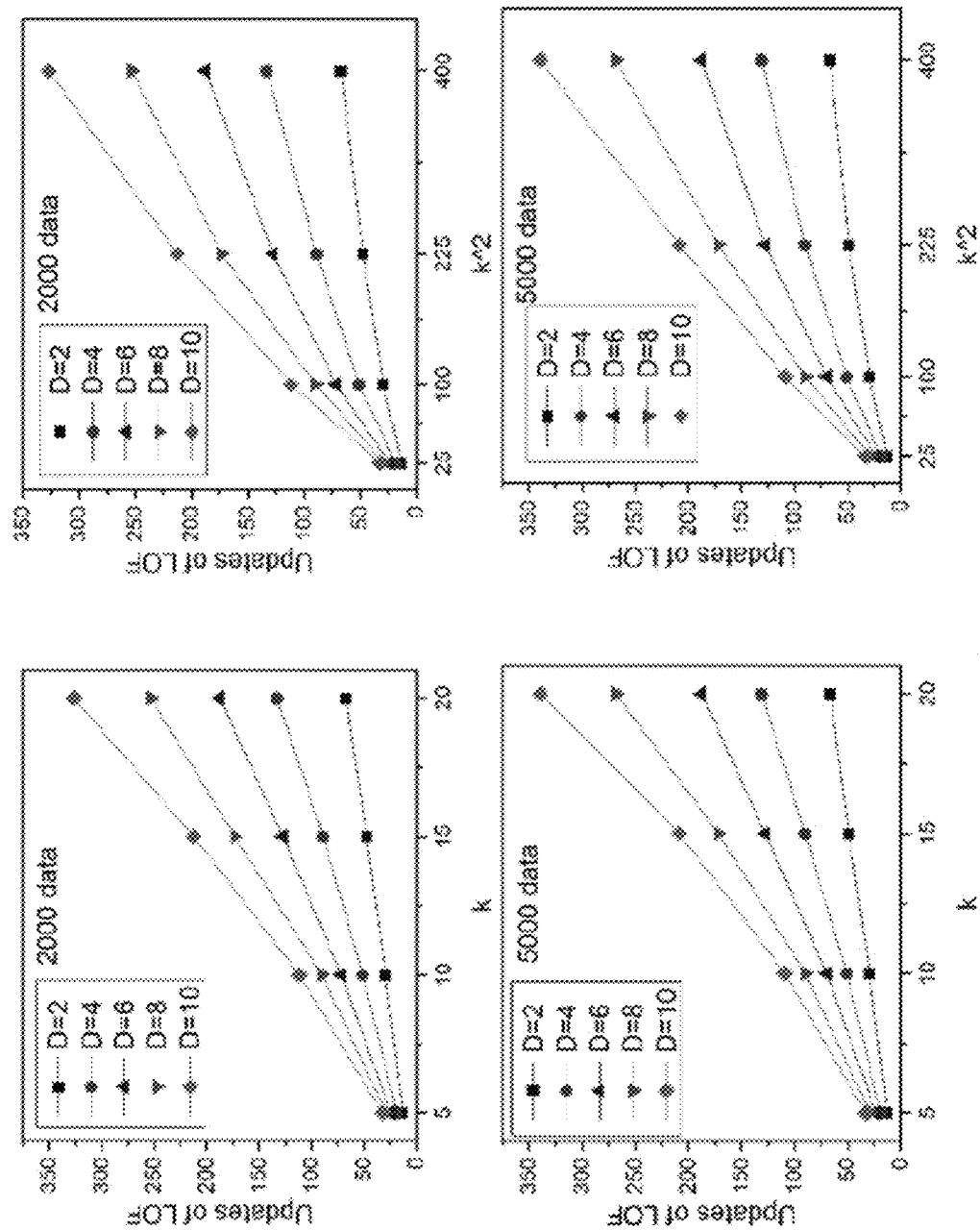
FIGS. 4C-4D illustrate the dependence of the number of hLOF updates on data dimension D and parameter k using data simulated from various distributions, in accordance with some embodiments of the present disclosure.
Figure 4D:
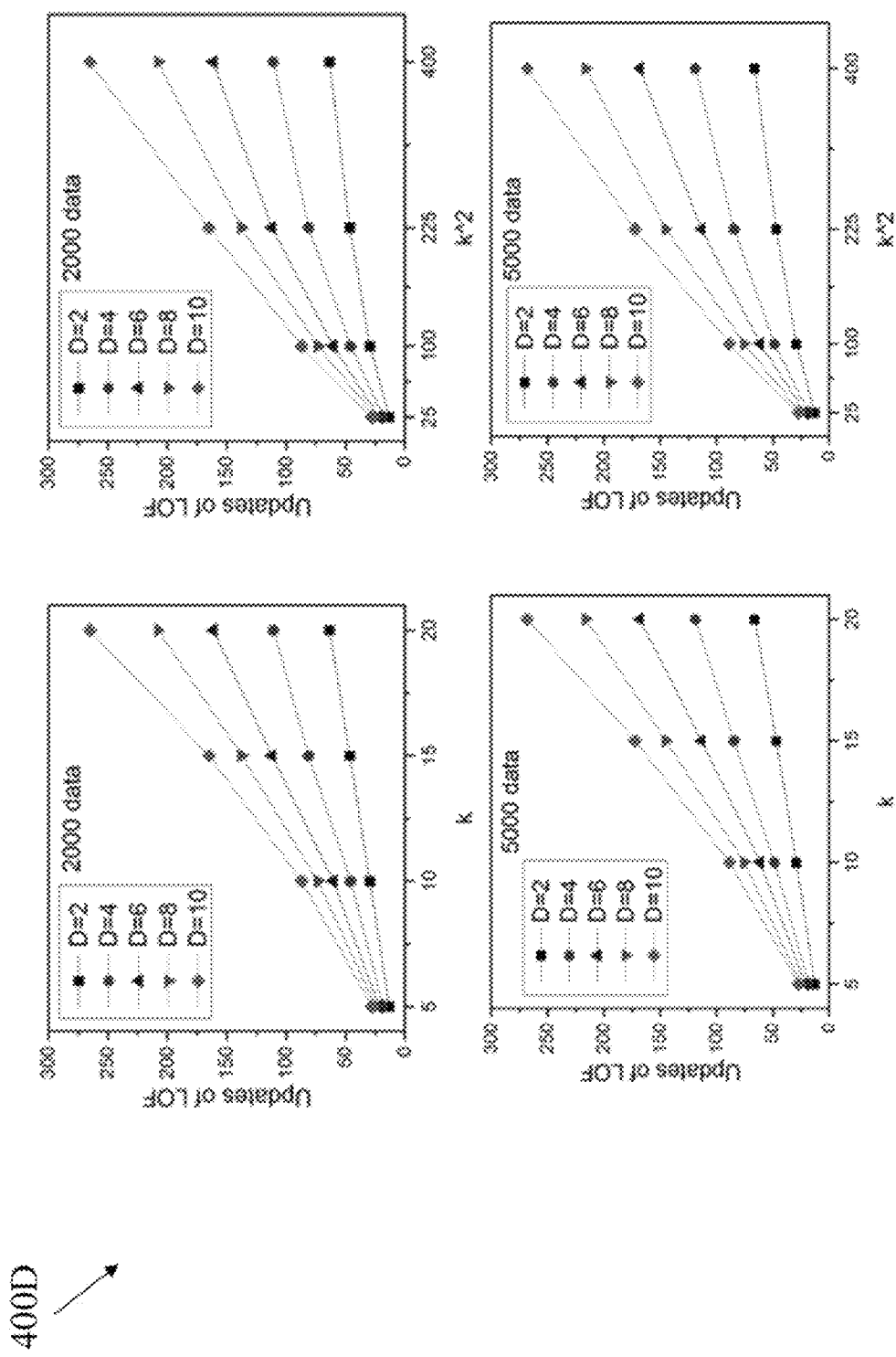

FIGS. 4C-4D show the dependence of the number of hLOF updates on data dimension D and parameter k using data simulated from various distributions, in accordance with some embodiments of the present disclosure.

FIGS. 4C-4D show the dependence of the number of hLOF updates on data dimension D and parameter kin standard Gaussian distribution and uniform distribution, respectively. FIGS. 4C-4D demonstrate that the number of hLOF updates: a) are increased with k, but it is not square-proportional to k, and b) increased with D, but was also not exponentially proportional to D, as proved above for the following theorems: (i) after insertion of new data $x_{new}$, the amount of kNN affected data is $|kNN|_{affected}=|IkNN(x_{new})|$; (ii) after insertion of new data $x_{new}$, the amount of IkNN affected data is $|IkNN|_{affected}=|kNN(x_{new})|+|IkNN(x_{new})|$; and (iii) after insertion of new data $x_{new}$, the amount of JkNN affected data is $|JkNN|_{affected}=|IkNN(X_{new})|*|IkNN(x_{remove})|$.

According to some embodiments of the present disclosure, FIGS. 4C-4D also show that the local neighborhood parameter k and data dimension D would not be a fatal bottleneck of the implementation of the present disclosure. This is a far better result when compared with a theoretical analysis, and may be partially explained by that the affected kNN, IkNN, and JkNN usually contain some identical data.

Figure 4E:
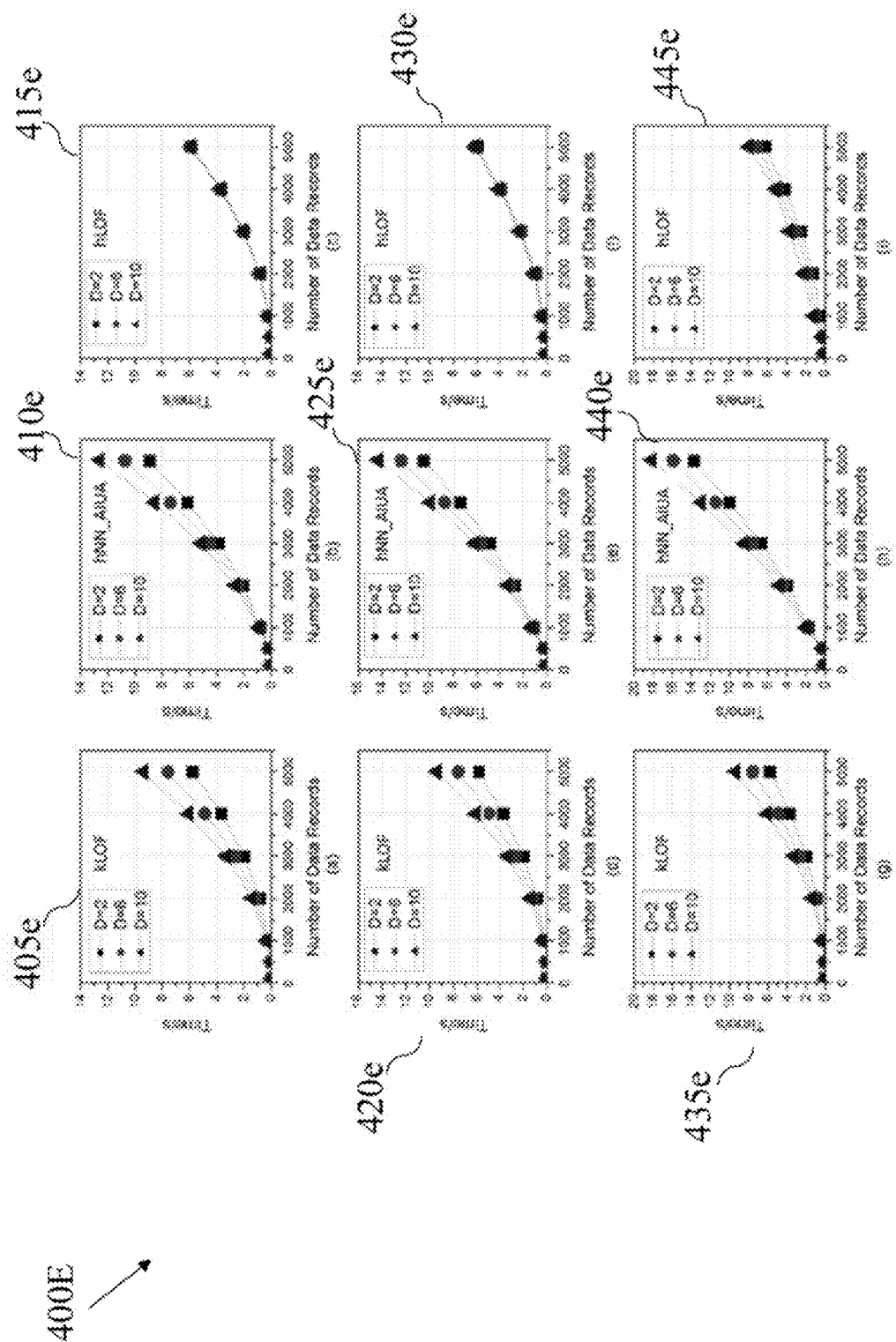
FIGS. 4E-4F illustrate the time for updating the local outlier factor on standard Gaussian distribution synthetic datasets, in accordance with some embodiments of the present disclosure.
Figure 4F:
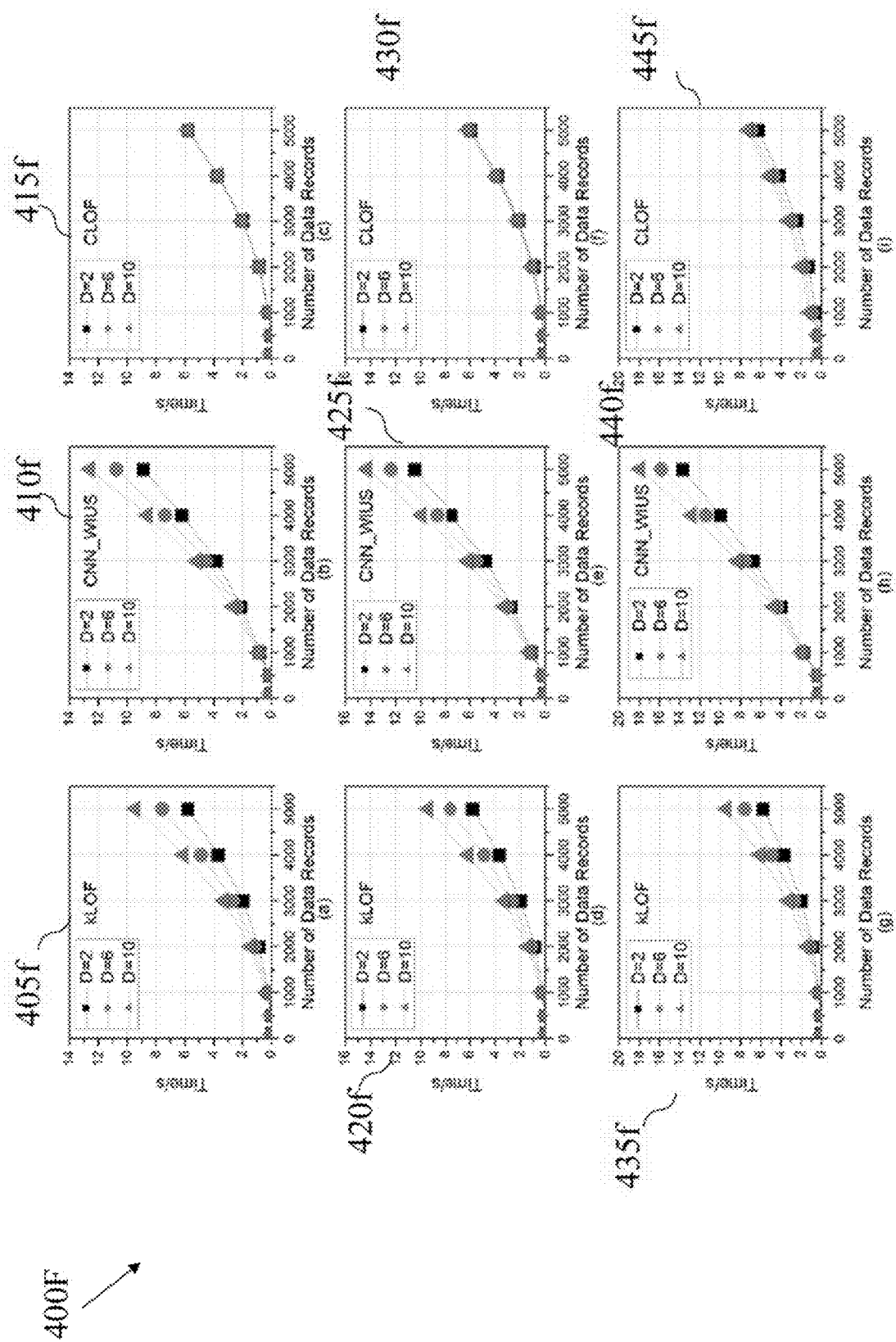

FIGS. 4E-4F show the time for updating the local outlier factor on standard Gaussian distribution synthetic datasets, in accordance with some embodiments of the present disclosure.

FIGS. 4E-4F show that the implementation of the present disclosure, hLOF method, had greater efficiency compared to the kLOF and the hNN_AIUA methods.

FIG. 4E shows the time for updating the local outlier factor on standard Gaussian distribution synthetic datasets: in the graphs denoted as elements 405e-415e, the time at k=5 and D=2, 6, 10 respectively; in the graphs denoted as elements 420e-430e, the time at k=10 and D=2, 6, 10 respectively; in the graphs denoted as elements 435e-445e, the time at k=20 and D=2, 6, 10 respectively, in accordance with some embodiments of the present disclosure.

For example, in the graphs denoted as elements 405e-415e, the updating time of kLOF, hNN_AIUA, and hLOF has been 5.7, 8.9, and 5.9 sec. respectively, when data dimension D=2 and sliding window width N=5000; In the graphs denoted as elements 420e-430e, the updating time of kLOF, hNN_AIUA, and hLOF was 7.6, 10.8 and 5.9 sec. respectively when data dimension D=6 and sliding window width N=5000; and in the graphs denoted as elements 435e-445e, the updating time of kLOF, hNN_AIUA, and hLOF was 9.4, 12.6, and 5.9 sec respectively when data dimension D=10 and sliding window width N=5000.

According to some embodiments of the present disclosure, the real-time anomalous data detection approach may be viable at scale. In addition, the present disclosure provides the ability to identify new fraud trends in real-time and secures low maintenance and lightweight production.

The results shown in FIG. 4E, indicate that the present disclosure which implements hLOF method, has comparable efficiency with state-of-the-art kNN based methods. The present disclosure which implement incremental update strategy could improve the efficiency of hNN based outlier detection methods, and this strategy reduced the sensitivity to data dimension D compared to the kLOF and hNN_AIUA methods.

According to some embodiments of the present disclosure, similar results were also obtained for the uniform distribution synthetic datasets, as shown in FIG. 4F.

FIG. 4F shows the time for updating local outlier factor on uniform distribution synthetic datasets: in the graphs denoted as elements 405f-415f, the time at k=5 and D=2, 6, 10 respectively; the graphs denoted as elements 420f-430f, the time at k=10 and D=2, 6, 10 respectively; the graphs denoted as elements 435f-445f, the time at k=20 and D=2, 6, 10 respectively.

FIG. 4F shows the efficiency of kLOF, hNN_AIUA methods, compared to the efficiency of the present disclosure implementing hLOF method. Efficiency of implementation of hLOF method is shown to be greater than efficiency of kLOF method, which is greater than efficiency of hNN_AIUA method when the sliding window width N was large enough.

FIGS. 5A-5I show results of three synthetic datasets with clear normal or outlier data information which were used to verify the fraud detection performance of implementation of the present disclosure. Based on each dataset to compare the proposed hLOF method with the kLOF method, the Receiver Operating characteristic Curves (ROC), False Positive Rate (FPR) versus true/positive Detection Rate (DR) were depicted with different k and sliding window widths n related to the outlier detection threshold t. The Area Under the ROC curve (AUC) was calculated as outlier detection accuracy.

According to some embodiment of the present disclosure, for two classic dataflows:

Synth-1 and Synth-2, there are the same descriptions, and these two datasets had enough data and could simulate a data stream. For the Synth-3, the size of consecutive outliers was cut down by equal interval sampling to reduce computational complexity. Synth-1 dataset: 60,593 normal data and 228 outlier data with 36 attributes arranged randomly and normalized to [0, 1].

Synth-2 dataset: 34,108 normal data (class 1) and 2644 outlier data (class 2, 3, 5, 6, 7) with nine attributes arranged randomly and normalized to [0, 1]. Synth-3 dataset: Two attributes, sampling the data at the intervals with 2305 normal data and 14 outliers.

Figure 5A:
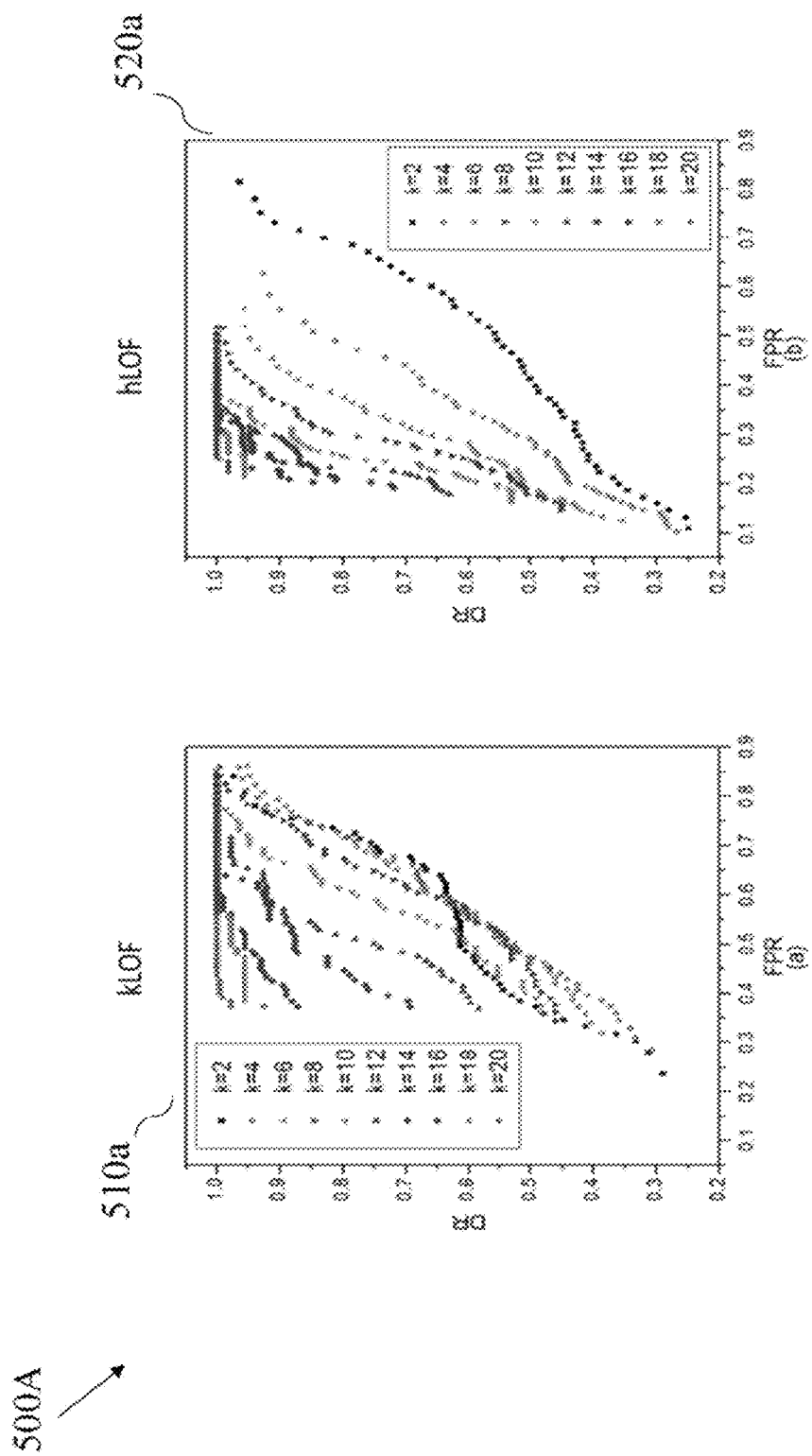
FIGS. 5A-5I illustrate results of three synthetic datasets with clear normal or outlier data information which were used to verify the fraud detection performance of implementation of the present disclosure, in accordance with some embodiments of the present disclosure.

Initially, different k was involved to investigate the effect of k on detection performance. As shown in FIG. 5A, ROC curves of kLOF 510a and hLOF 520a methods on the Synth-1 dataset were drawn with different k, changing from 2 to 20 with interval 2, related to t changing from 50 to 1 with interval 1 and n fixed to 50.

After comparing the results in elements 510a and 520a in FIG. 5A, it is shown that both FPR and DR increased with a decrease in t and an increase in k. For the same k, t, and FPR, the DR of the new hLOF method was much better than that of the kLOF method, which also led to a much higher AUC value than that of the kLOF method as shown in element 510b in FIG. 5B. The boxplots in element 520b in FIG. 5B sec. illustrates the performance of kLOF method vs. hLOF in which hLOP performance is much better than kLOP performance. kLOF and hLOF AUC values with different k, and indicates that the implementation of the present disclosure, hLOF method has better outlier against k changing than the kNN based method.

FIG. 5A shows ROC curves of kLOF and hLOF methods on the Synth-1 dataset with different k related to t: element 510a presents the ROC curves of kLOF method; element 520a presents the ROC curves of the present disclosure, hLOF method, in accordance with some embodiments of the disclosure.

Figure 5B:
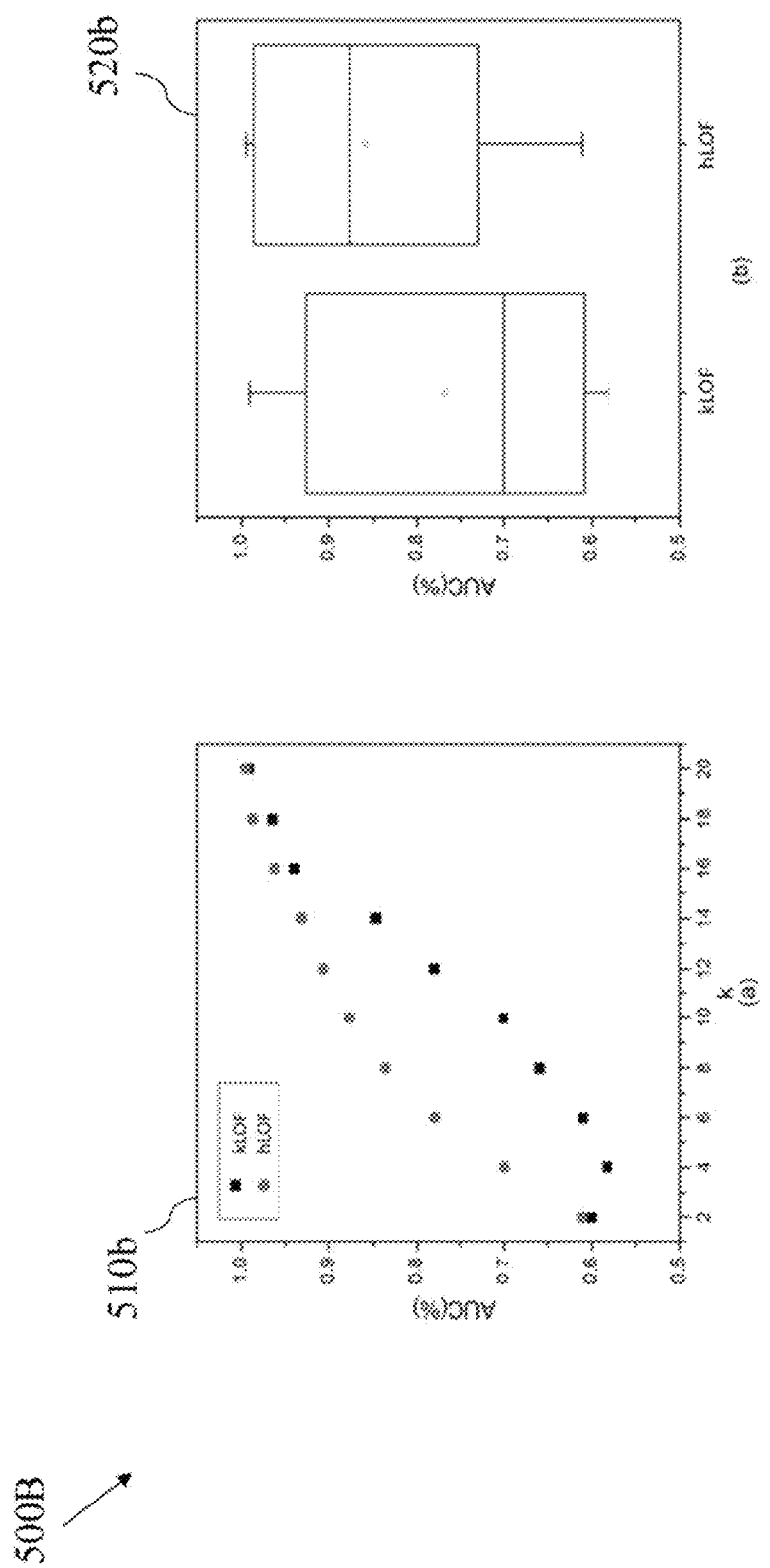

FIG. 5B shows AUC values of kLOF and hLOF methods on Synth-1 dataset with different k values related to t and the boxplots for kLOF and hLOF: element 510b presents the AUC values of kLOF and hLOF methods; element 520b presents the boxplots for kLOF and hLOF methods, in accordance with some embodiments of the disclosure.

Figure 5C:
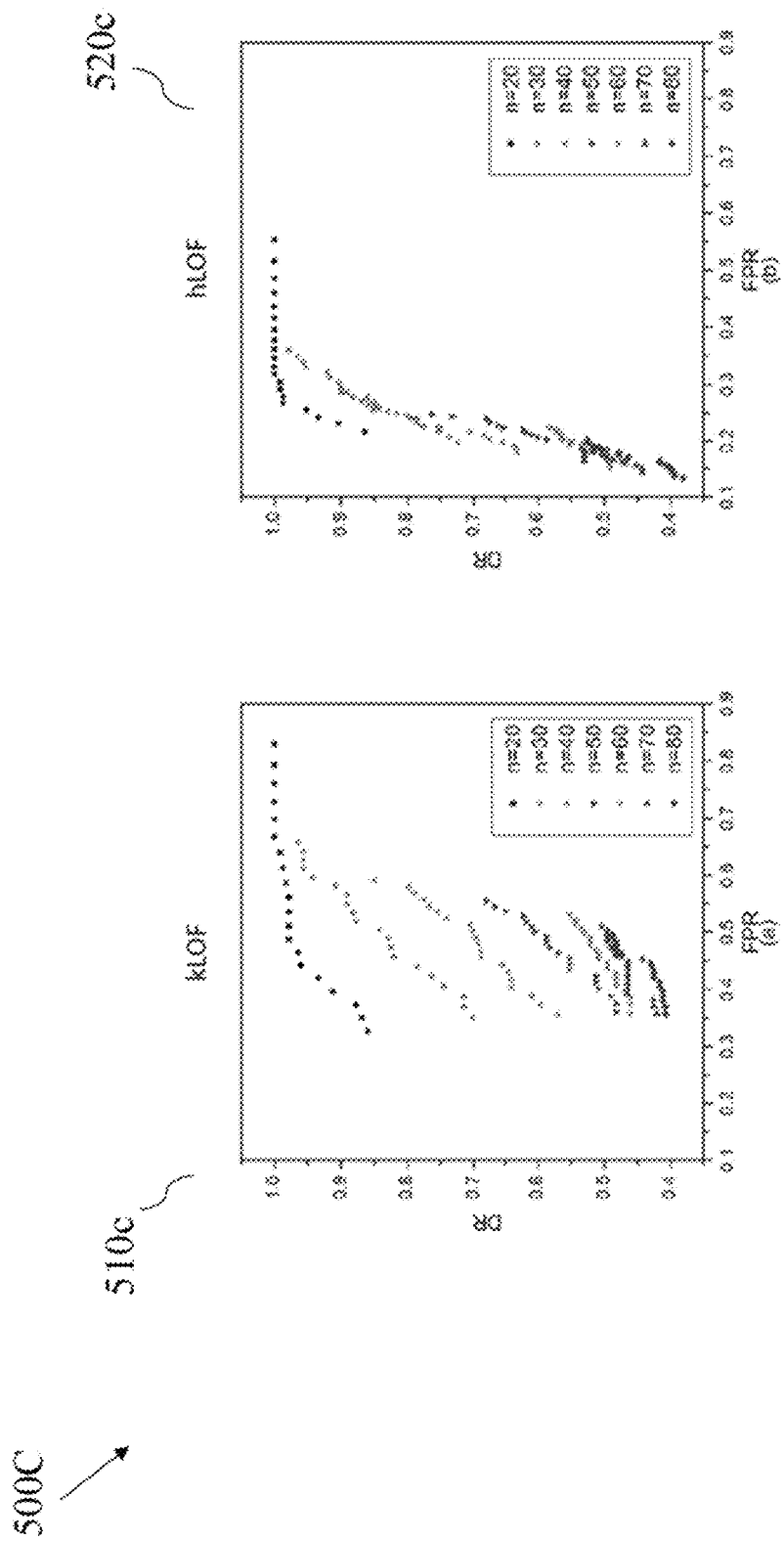

The parameter n was adopted to investigate its effect on detection performance. As shown in FIG. 5C, ROC curves of kLOF and hLOF methods on the Synth-1 dataset were drawn with different n changing from 20 to 80 with interval 10, related to t changing from 20 to 1 with interval 1, and k fixed to 10. It was shown that both FPR and DR increased with the decrease oft and the increase of n. For the same k, t, and FPR, the DR of the new hLOF method was also much better than that of the kLOF method, which led to a much higher AUC value as shown in FIG. 5D by element 510d.

Figure 5D:
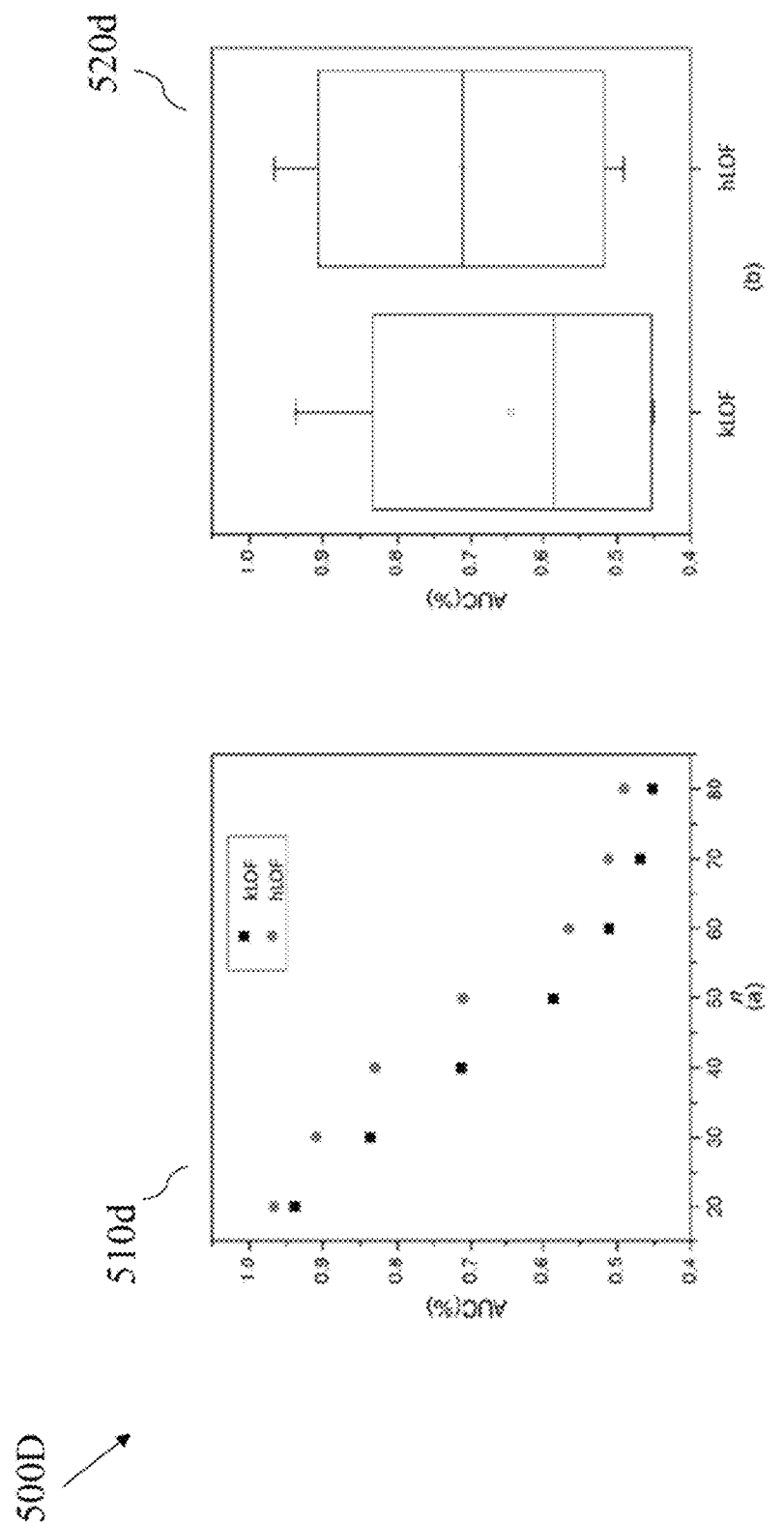

The boxplots element 520d in FIG. 5D shows the dispersion of kLOF and hLOF AUC values, and indicates that the hLOF method has better outlier detection performance and stability against n changing than kNN based method.

FIG. 5C shows ROC curves of kLOF and hLOF methods on the Synth-1 dataset with different n related to t. Element 510c shows the ROC curves of kLOF method; Element 520c shows the ROC curves of hLOF method, in accordance with some embodiments of the disclosure.

FIG. 5D shows AUC values of kLOF and hLOF methods on Synth-1 dataset with different n related to t, and the boxplots for kLOF and hLOF, in accordance with some embodiments of the disclosure.

Element 510d shows the AUC values of kLOF and hLOF methods; Element 520d shows the boxplots for kLOF and hLOF methods.

Similar results are also appeared in the analysis of the Synth-2 dataset, as shown in FIGS. 5E-5H.

According to some embodiments of the present disclosure, the hNN based method hLOF has better outlier detection performance and stability against n and k changing than the kNN-based method kLOF.

Figure 5E:
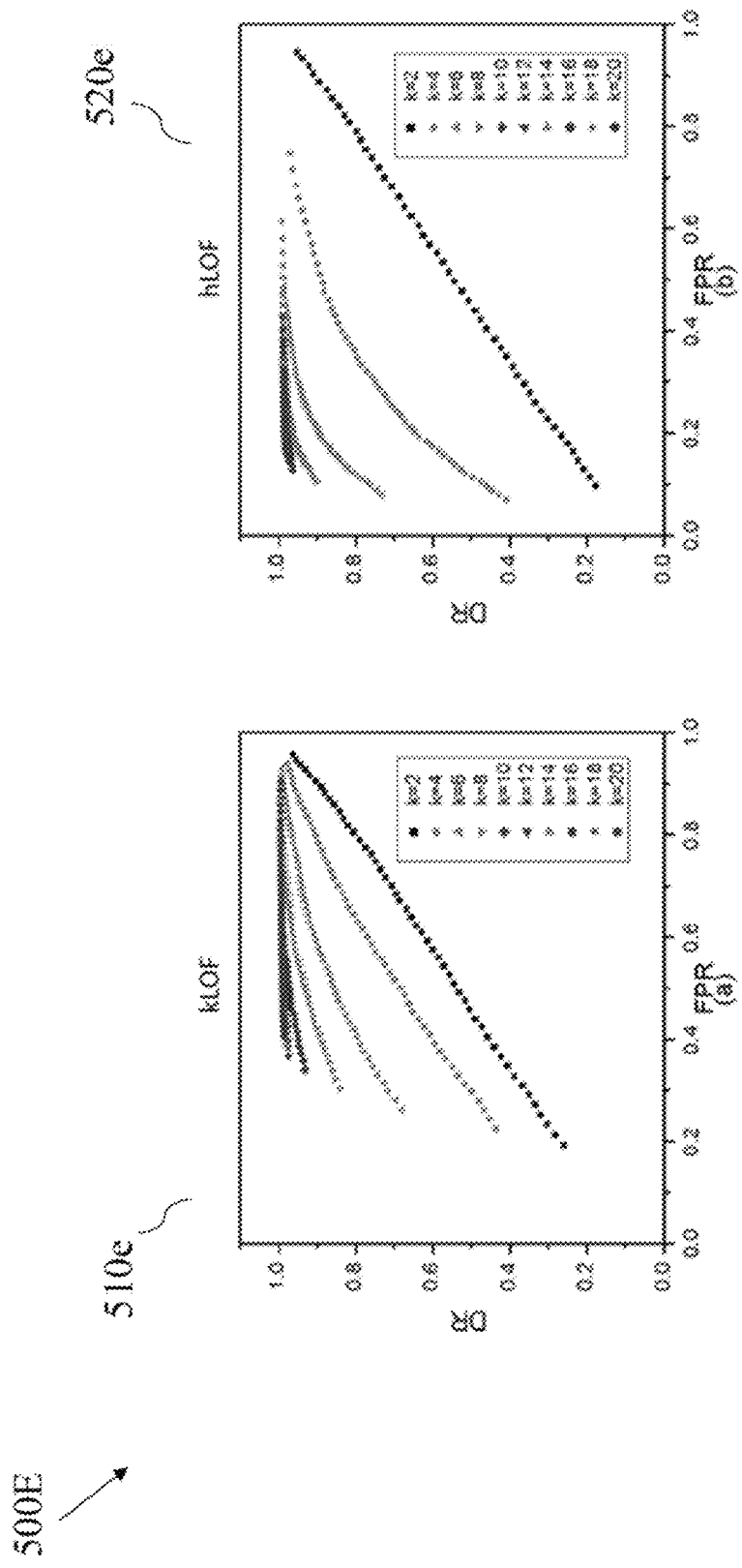

FIG. 5E shows ROC curves of kLOF and hLOF methods on the Synth-2 dataset with different k related to t, in accordance with some embodiments of the disclosure. Element 510e shows that the ROC curves of kLOF method; Element 520e shows that the ROC curves of the implemented disclosure, hLOF method.

Figure 5F:
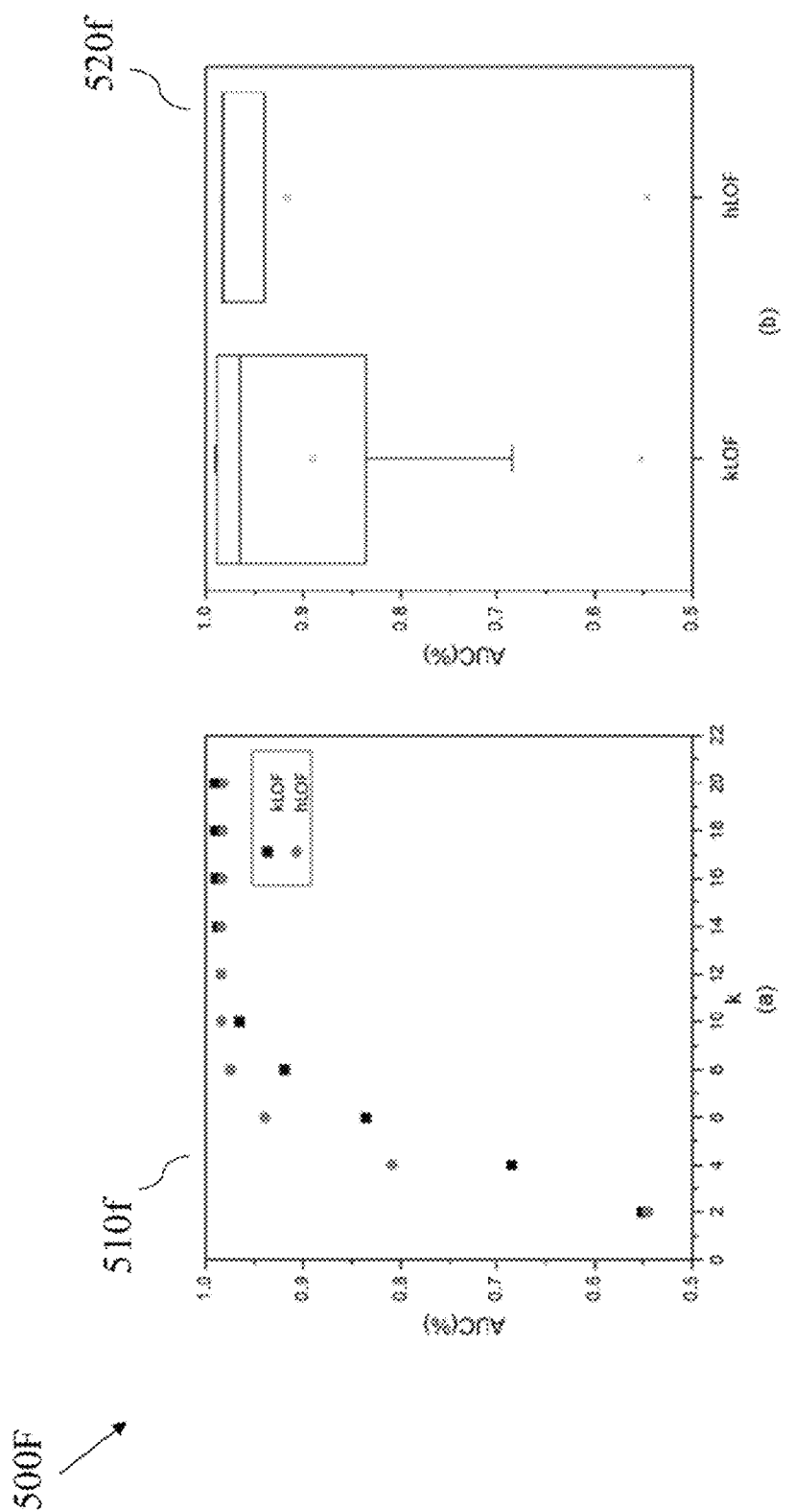

FIG. 5F shows AUC values of kLOF and hLOF methods on the Synth-2 dataset with different k related to t and the box plots for kLOF and hLOF, in accordance with some embodiments of the disclosure. Element 510f shows that the AUC values of kLOF and hLOF methods; and Element 520f shows that the boxplots for kLOF and hLOF methods.

Figure 5G:
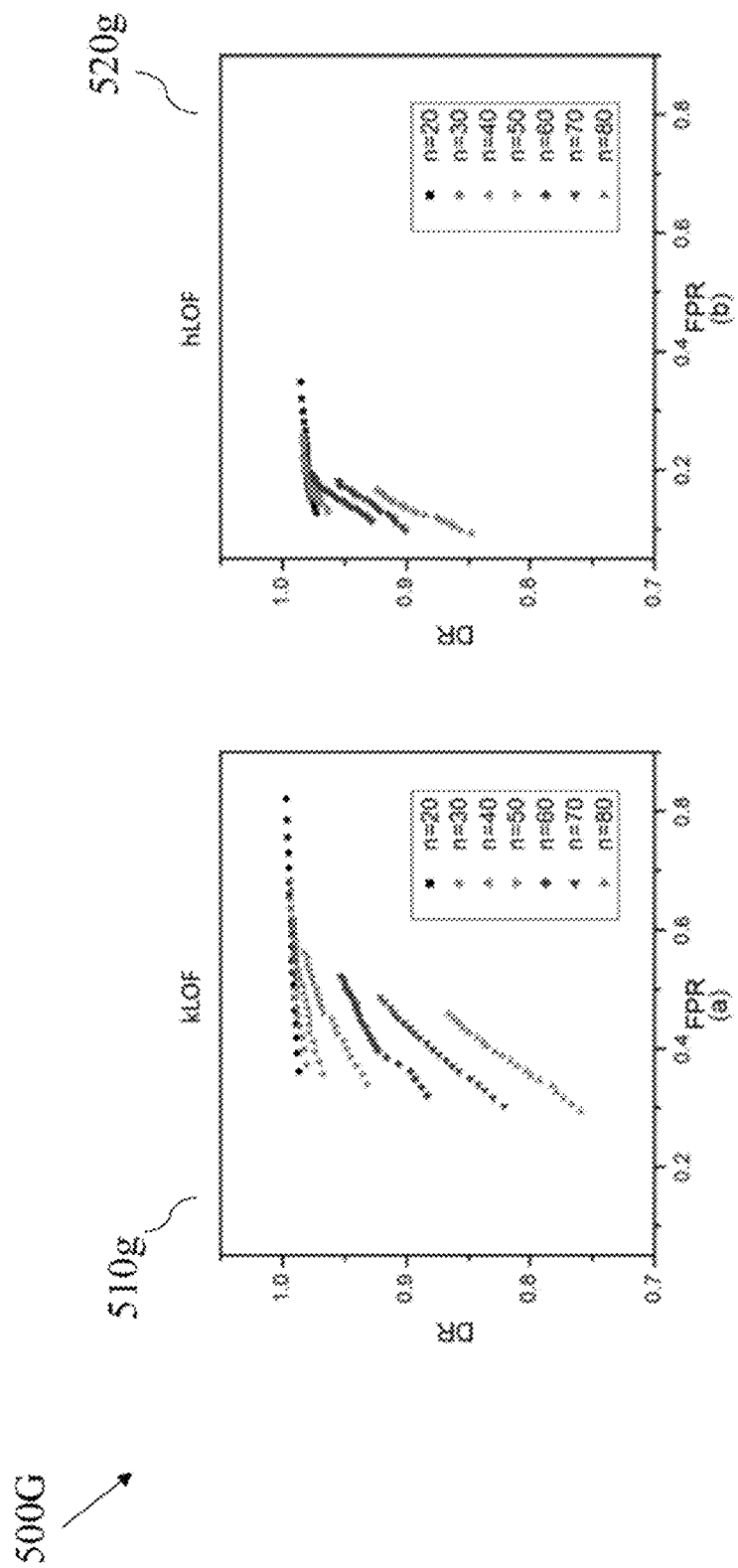

FIG. 5G shows ROC curves of kLOF and hLOF methods on the Synth-2 dataset with different n related to t, in accordance with some embodiments of the disclosure. Element 510g shows that the ROC curves of kLOF method; Element 520g shows that the ROC curves of the present disclosure, hLOF method.

Figure 5H:
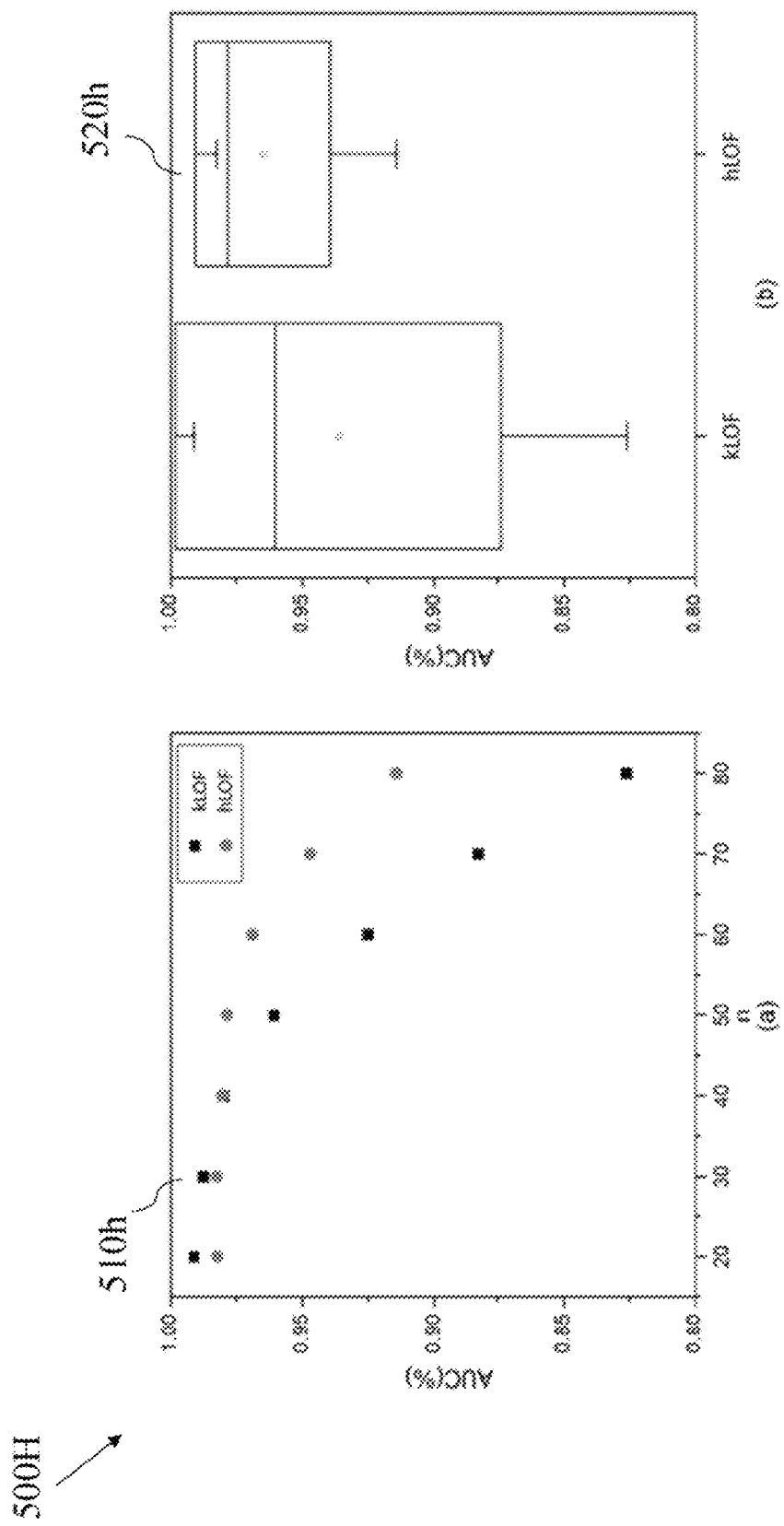

FIG. 5H shows AUC values of kLOF and hLOF methods on Synth-2 dataset with different n related to t and the boxplot for kLOF and hLOF, in accordance with some embodiments of the disclosure. Element 510h shows that AUC values of kLOF and hLOF methods; and Element 520h shows that the boxplots for kLOF and hLOF methods.

Figure 5I:
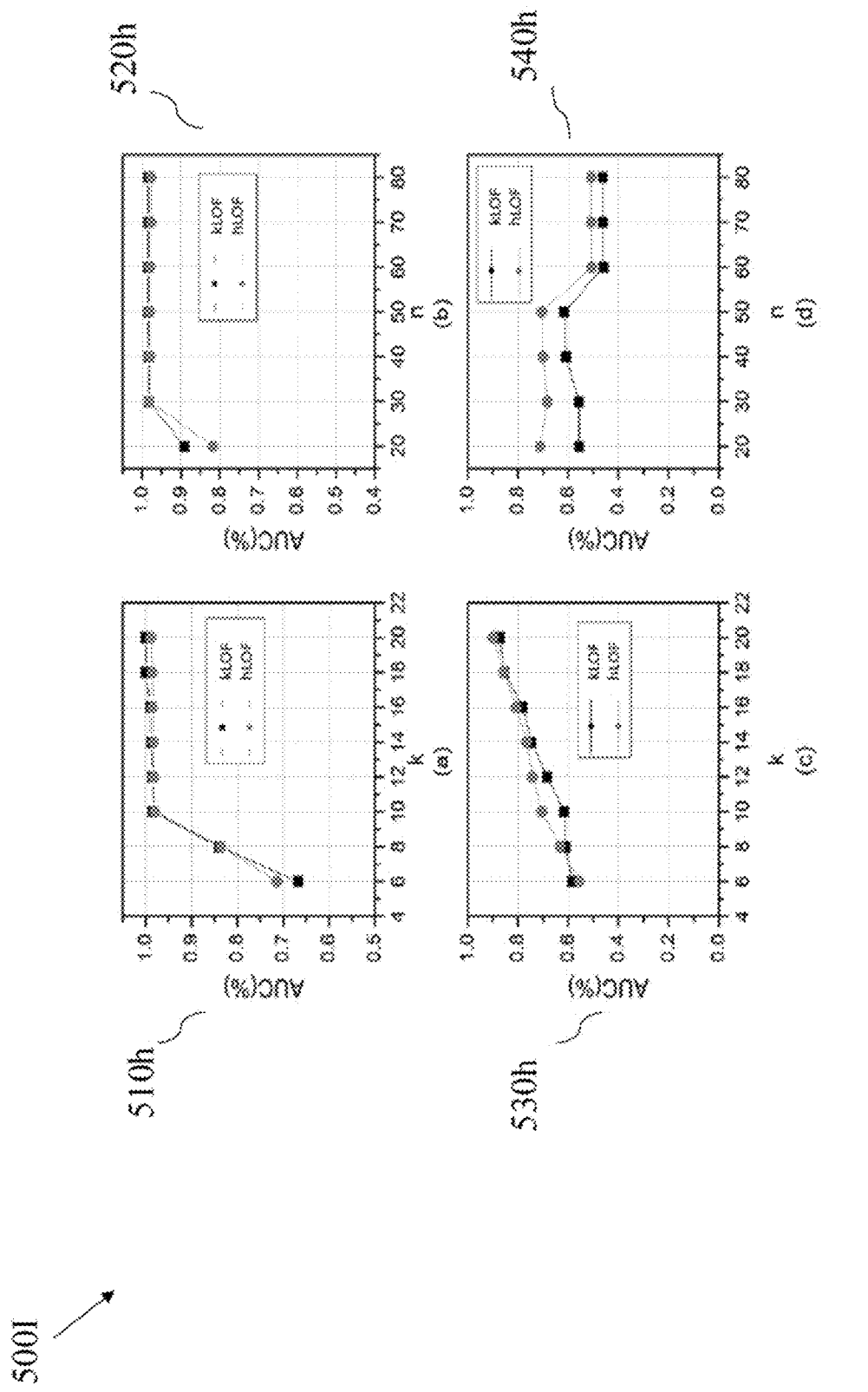

FIG. 5I shows AUC values of kLOF and hLOF methods on the Synth-3 dataset in accordance with some embodiments of the disclosure. Element 510i shows that AUC values of kLOF and hLOF methods with different k and n=50 on the dataset; Element 520i shows that AUC values of kLOF and hLOF methods with different n and k=10 on the dataset; Element 530i shows that AUC values of kLOF and hLOF methods with different k and n=50 on dataset; and Element 540i shows that AUC values of kLOF and hLOF methods with different n and k=10 on dataset.

According to some embodiments of the present disclosure, the tests on three synthetic datasets, shows that the implementation of the present disclosure, hLOF method obtains better outlier detection performance than the kNN-based, kLOF method.

In many applications such as signal processing and intrusion detection of the network, fraud detection in financial domain, it is very important to obtain high Detection rate (DR) with low False Positive rate (FPR).

However, the DR and FPR are two conflicting factors, and DR increased with FPR. In the tests with different k, when k may increase and becomes close to n, DR tends to increase quickly, and FPR tends to increase slowly. In the tests with different n, when n increases away from k, DR tends to increase slowly, and FPR tends to increase quickly. These results indicate that the maximum compromise of DR and FPR appears when k is close to n. The choice of k and n can be summarized as the optimization problem of sliding window width.

According to some embodiments of the present disclosure, Heterogeneous nearest neighborhoods (hNN) consisting of the k-nearest neighbor, inverse nearest neighbor (IkNN) and joint nearest neighbor (JkNN) are involved, to describe the local features of the data. To follow the non-homogeneity in data streams, a fixed sliding window with data updates is introduced, and the influence of these updates on algorithm complexity is depicted.

The theoretical evidence of algorithm run-time complexity for insertion of new data and deletion of old data in composite local neighborhood shows that the amount of data affected in the incremental calculation is limited, and the proposed approach has comparable algorithm complexity with the state-of-the-art methods. Finally, experiments performed on three synthetic datasets verify its complexity and scalability, and shows its improved outlier detection performance.

Figure 6:
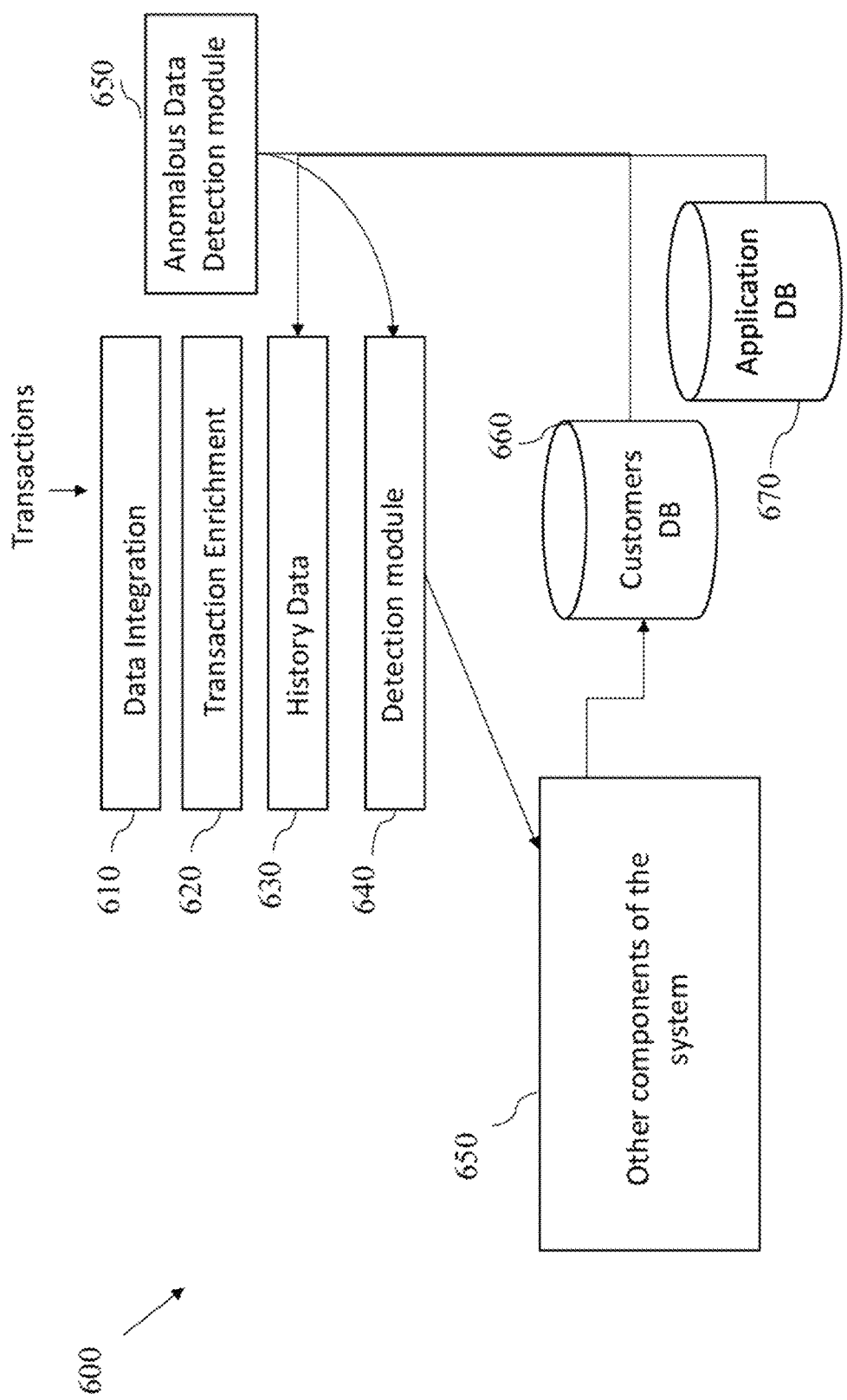
FIG. 6 illustrates a detection module in a global system, in accordance with some embodiments of the present disclosure.

FIG. 6 illustrates a detection module in a global system, in accordance with some embodiments of the present disclosure.

According to some embodiments of the present disclosure, the present disclosure may be implemented by receiving a data stream comprised of unlabeled data points e.g., processed data which may be combined of: (i) data integration from multiple applications such as 610; (ii) transaction enrichment such as 620; and (iii) historical data such as 630, from a global system, such as system 600, and may operate a detection module, i.e., an Anomalous Data Detection (ADD) module 640 such as ADD module 200 in FIG. 2, to prepare a dataset and identify one or more data points e.g., transactions as outliers to send an alert with details related to the identified one or more outliers in the data stream thus, dynamically evaluating local outliers in the received data stream.

According to some embodiments of the present disclosure, the ADD module is an online incremental unsupervised machine learning model.

According to some embodiments of the present disclosure, the implementation of the present disclosure does not impact on the architecture or the system 600 itself. Nor does it affect the pre-detection and post detection stages of the system 600.

According to some embodiments of the present disclosure, there are incoming transactions into data integration component such as data integration 610, which makes an initial preprocess of the data. Transaction enrichments component 620 may perform transaction enrichments, which is the process of preprocess of the transactions. Historical data component 630, which may receive data from application database 670 or customers database 660 may perform the process of getting historical data synchronizes with new incoming transactions. It follows by an anomaly detection such as fraud detection by the Anomalous Data Detection (ADD) module such as ADD module in FIG. 2 after which, each transaction is classified as fraud or clear transaction, and an alert with related details may be sent to other parts of the system 650 such as to be presented to a user via a display unit or to a preconfigured application that is connected to the system.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for real-time detection of anomalous data, by processing high-speed streaming data, said computerized-method comprising:
   in a computerized-system comprising a processor and a memory, receiving by the processor, a data stream comprised of unlabeled data points,
   operating by the processor an Anomalous Data Detection (ADD) module, said ADD module is configured to:
   (i) receive: k, X, d, threshold, and n,
      wherein k is a number of data point neighbors for each data point,
      wherein X is a number of data points in a predetermined period of time,
      wherein d is a number of dimensions of each data point,
      wherein n is a number of data points that said ADD module is operating on, in a predefined time unit;
   (ii) prepare a dataset having n data points from the received X data points; and
   (iii) identify one or more data points, from the received data stream, as outliers to send an alert with details related to the identified outliers thus, dynamically evaluating local outliers in the received data stream,
      wherein the reparation of the dataset is comprising:
   (ii.a) fetching X data points from a data storage device, according to at least one preconfigured criterion;
   (ii.b) retrieving random n data points from the retrieved X data points to yield a dataset;
   (ii.c) for each data point in the dataset:
      ii.c.i. applying at least one classification algorithm to yield a set of results from each applied classification algorithm and to determine k data points neighbors;
      ii.c.ii marking the data points in the set of results as related to the dataset;
      ii.c.iii calculating a local density, wherein said local density is corresponding to a calculated heterogenous nearest neighbors Local Outlier Factor (hLOF) area of the data point;
      ii.c.iv associating an outlier counter and zeroing said outlier counter; and
      ii.c.v marking said data point as a potential-outlier by increasing by 1 each associated outlier counter that its calculated local density is higher than 1.

2. The computerized-method of claim 1, wherein the identifying of one or more data points as outliers is performed by:
   a. reading a first data point and a second data point from the received data stream;

b. applying the at least one classification algorithm on the first data point and on each data point that is related to the prepared dataset, to yield a first group of results and to delete a data point that is not in the first group of results, from the dataset;

c. checking the associated outlier counter of the deleted data point to mark the deleted data point as an outlier when the value of the associated outlier counter is greater than the received threshold;

d. applying the at least one classification algorithm on the first data point and on each data point in the first group of results to yield a second group of results;

e. for each data point in the second group of results:
   i. applying the at least one classification algorithm on the second data point and on each data point in the second group of results, to yield a third group of results for each data point and to delete at least one data point that is not in the third group of results, from the second group of results;
   ii. calculating a local density, wherein said local density is corresponding to a calculated heterogenous nearest neighbors Local Outlier Factor (hLOF) area of the first group of results;

f. checking the associated outlier counter of the at least one deleted data point that is not in the third group of results to mark the at least one deleted data point as an outlier when the value of the associated outlier counter is greater than the received threshold;

g. applying the at least one classification algorithm on the second data point and on each data point in the third group of results, to yield a fourth group of results;

h. for each data point in the fourth group of results:
   i. applying at least one classification algorithm to yield a fifth group of results from each applied classification algorithm and to determine k data points neighbors;
   ii. calculating a local density, wherein said local density is corresponding to a calculated heterogenous nearest neighbors Local Outlier Factor (hLOF) area of the data point;
   iii. marking said data point as a potential-outlier by increasing by 1 each associated outlier counter that its calculated local density is higher than 1; and i. marking the fifth group of results as a dataset; and j. repeating step (a) through step (j).

3. The computerized-method of claim 2, wherein the first group of results, the second group of results, the third group of results, the fourth group of results and the fifth group of results include determined k data points neighbors.

4. The computerized-method of claim 1, wherein the alert that is sent is presented to a user via a display unit.

5. The computerized-method of claim 1, wherein the alert that is sent is forwarded to a preconfigured application.

6. The computerized-method of claim 1, wherein the data stream is a financial data stream and the detected anomalous activity is fraud.

7. The computerized-method of claim 1, wherein the data stream is selected from a group of: environmental sensors, social network analysis, computer network traffic, web searches or other.

8. The computerized-method of claim 1, wherein the at least one classification algorithm is selected from:
   a. k Nearest Neighbors (kNN) algorithm;
   b. Inverse of k Nearest Neighbors (IkNN) algorithm;
   c. Joint of k Nearest Neighbors (JkNN) algorithm;
   or any combination thereof.

9. The computerized-method of claim 1, wherein the local density is calculated by applying a distance-based method that is calculating an average distance between the read data point and k nearest data point neighbors.

10. The computerized-method of claim 9, wherein the k nearest data point neighbors are calculated according to distance metrics.

11. The computerized-method of claim 10, wherein the distance metrics are Euclidean distance metric, Manhattan distance metric or other distance metrics.

12. The computerized-method of claim 1, wherein the calculated heterogenous nearest neighbors Local Outlier Factor (hLOF) area is a set of data points which is a combination of the set of results of each operated classification algorithm.

13. The computerized-method of claim 1, wherein the received threshold is determined according to the number of standard deviations of a data point from the mean.

14. The computerized-method of claim 1, wherein the number of dimensions of a data point is a number of attributes therein.

15. The computerized-method of claim 1, wherein the data point neighbors are determined as such, according to preconfigured distance metrics.

* * * * *